United States Patent
Yamashiro

(10) Patent No.: US 12,155,081 B2
(45) Date of Patent: Nov. 26, 2024

(54) POWER SUPPLY DEVICE, ELECTRIC VEHICLE AND POWER STORAGE DEVICE PROVIDED WITH SAID POWER SUPPLY DEVICE, AND FASTENING MEMBER FOR POWER SUPPLY DEVICE

(71) Applicant: SANYO Electric Co., Ltd., Osaka (JP)

(72) Inventor: Go Yamashiro, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 547 days.

(21) Appl. No.: 17/441,243

(22) PCT Filed: Dec. 24, 2019

(86) PCT No.: PCT/JP2019/050463
§ 371 (c)(1),
(2) Date: Sep. 20, 2021

(87) PCT Pub. No.: WO2020/202670
PCT Pub. Date: Oct. 8, 2020

(65) Prior Publication Data
US 2022/0173474 A1 Jun. 2, 2022

(30) Foreign Application Priority Data

Mar. 29, 2019 (JP) .................................. 2019-066829

(51) Int. Cl.
*H01M 50/264* (2021.01)
*H01M 50/209* (2021.01)
*H01M 50/262* (2021.01)

(52) U.S. Cl.
CPC ....... *H01M 50/264* (2021.01); *H01M 50/209* (2021.01); *H01M 50/262* (2021.01); *H01M 2220/20* (2013.01)

(58) Field of Classification Search
CPC . H01M 50/264; H01M 50/262; H01M 50/209
See application file for complete search history.

(56) References Cited

U.S. PATENT DOCUMENTS

2015/0333305 A1 11/2015 Seki et al.
2017/0331140 A1* 11/2017 Schneider ........... H01M 50/553

FOREIGN PATENT DOCUMENTS

| JP | 2014-216218 A | 11/2014 |
| JP | 2015-220117 | 12/2015 |
| JP | 2016-046233 A | 4/2016 |

OTHER PUBLICATIONS

English translation of Chinese Search Report dated Dec. 8, 2022, issued in counterpart CN Application No. 201980094924.3. (3 pages).

(Continued)

*Primary Examiner* — Olatunji A Godo
(74) *Attorney, Agent, or Firm* — WHDA, LLP

(57) ABSTRACT

A power supply device includes a battery stack body including a plurality of secondary battery cells are stacked, a pair of end plates covering both end surfaces of the battery stack body, and a plurality of fastening members each disposed on an opposing side surface of the battery stack body to fasten the end plates to each other. Fastening member includes end-part fastening parts fixed to the end plates at both ends in a longer direction, and intermediate coupling part coupling end-part fastening parts to each other, and intermediate coupling part has a plate shape extending along a side surface of the battery stack body, and includes a plurality of rows of coupling bars formed in a wave shape in front view of fastening member. At the time of expansion of the secondary battery cells, the power supply device elastically deforms coupling bar in a plane along the side surface of the battery stack body so that intermediate coupling part stretches in the stack direction of the secondary battery cells.

20 Claims, 10 Drawing Sheets

(56) References Cited

OTHER PUBLICATIONS

International Search Report of PCT application No. PCT/JP2019/050463 dated Mar. 17, 2020.

* cited by examiner

POWER SUPPLY DEVICE, ELECTRIC VEHICLE AND POWER STORAGE DEVICE PROVIDED WITH SAID POWER SUPPLY DEVICE, AND FASTENING MEMBER FOR POWER SUPPLY DEVICE

CROSS-REFERENCE TO RELATED APPLICATIONS

This application is a U.S. national stage application of the PCT International Application No. PCT/JP2019/050463 filed on Dec. 24, 2019, which claims the benefit of foreign priority of Japanese patent application No. 2019-066829 filed on Mar. 29, 2019, the contents all of which are incorporated herein by reference.

TECHNICAL FIELD

The present invention relates to a power supply device in which end plates disposed at both ends of a battery stack body in which a plurality of secondary battery cells are stacked are coupled with a fastening member, an electric vehicle and a power storage device that are provided with the power supply device, and a fastening member for a power supply device.

BACKGROUND ART

A typical power supply device includes a battery stack body including a plurality of prismatic battery cells, a pair of end plates disposed on both end surfaces of the battery stack body, and a fastening member such as a binding bar coupling the pair of end plates (see PTL 1). By binding the battery stack body using the end plates and the binding bar, this power supply device can assemble the battery stack body including the plurality of prismatic battery cells.

CITATION LIST

Patent Literature

PTL 1: Unexamined Japanese Patent Publication No. 2015-220117

SUMMARY OF THE INVENTION

In the power supply device of PTL 1, since the battery stack body including the plurality of prismatic battery cells is assembled via the binding bar and the end plate, expansion of the plurality of prismatic battery cells constituting the battery stack body is suppressed. That is, since expansion of the prismatic battery cells is suppressed via the binding bar and the end plate, a large force is applied to the binding bar and the end plate.

On the other hand, each prismatic battery cell has a tendency that, when an attempt is made to increase the energy density per volume or the energy density per weight, a dimensional change accompanying charge and discharge or deterioration increases. The load applied to the binding bar and the end plate is caused by the expansion amount of the prismatic battery cell. Therefore, when a prismatic battery cell having a large dimensional change accompanying the expansion amount is used, a strong load is applied to the end plate and the binding bar at the time of expansion of the prismatic battery cell in the configuration of the power supply device of PTL 1. As a result, a strong shear stress acts on the joint portion between the binding bar and the end plate, which may cause breakage. Therefore, it is required to enhance the rigidity of the binding bar.

However, in general, when the rigidity of the metal material is increased, the stretchability deteriorates. When the prismatic battery cell expands, a load is applied in a direction where the binding bar extends, but there is a contradictory problem that resistance to expansion conversely decreases when stretchability decreases.

An object of the present invention is to provide a power supply device that secures stretchability at the time of expansion while enhancing coupling strength with an end plate in a fastening member for fastening a battery stack body in which a plurality of secondary battery cells are stacked, an electric vehicle and a power storage device including the power supply device, and a fastening member for the power supply device.

Solution to Problem

A power supply device according to an aspect of the present invention includes: battery stack body 10, 20 in which a plurality of secondary battery cells 1 each including prismatic exterior can 1$a$ are stacked; a pair of end plates 3 covering both end surfaces of battery stack body 10, 20 in a stack direction; and a plurality of fastening members 4, 14, 24 disposed on an opposing side surface of battery stack body 10, 20 to fasten end plates 3 to each other. Each of the plurality of fastening members 4, 14, 24 includes end-part fastening part 4X, 14X, 24X fixed to end plate 3 at each of both ends in a longer direction, and intermediate coupling part 4Y, 14Y, 24Y coupling between end-part fastening parts 4X, 14X, 24X, in which intermediate coupling part 4Y, 14Y, 24Y includes a plurality of rows of coupling bars 6 having a plate shape extending along side surface 10$a$, 20$a$ of battery stack body 10, 20 and formed in a wave shape in front view of fastening members 4, 24. At the time of expansion of secondary battery cells 1, the power supply device elastically deforms coupling bar 6 in a plane parallel to side surface 10$a$, 20$a$ of battery stack body 10, 20 such that intermediate coupling part 4Y, 14Y, 24Y is stretched in the stack direction of secondary battery cells 1.

An electric vehicle according to an aspect of the present invention includes power supply device 100, traveling motor 93 to which electric power is supplied from power supply device 100, vehicle body 91 on which power supply device 100 and motor 93 are mounted, and wheels 97 driven by motor 93 to cause vehicle body 91 to travel.

A power storage device according to an aspect of the present invention includes power supply device 100 and power supply controller 88 that controls charging and discharging of power supply device 100, and power supply controller 88 enables charging of secondary battery cells 1 with power from the outside and perform control so as to charge secondary battery cells 1.

A fastening member for a power supply device according to an aspect of the present invention is a fastening member for a power supply device for fastening the pair of end plates 3 covering both end surfaces of battery stack body 10, 20 in which the plurality of secondary battery cells 1 each including prismatic exterior can 1$a$ are stacked, the fastening member including: end-part fastening part 4X, 14X, 24X fixed to end plate 3 at each of both ends in a longer direction; and intermediate coupling part 4Y, 14Y, 24Y coupling between end-part fastening parts 4X, 14X, 24X, in which intermediate coupling part 4Y, 14Y, 24Y includes first coupling bar 6X, 16X and second coupling bar 6Y, 16Y that have a plate shape extending along side surface 10$a$, 20$a$ of battery stack body 10, 20 and formed in a wave shape vertically symmetrical to each other in front view, and both ends of first coupling bar 6X, 16X and second coupling bar 6Y, 16Y are coupled to end-part fastening parts 4X, 14X.

According to the power supply device described above, it is possible to achieve both contradictory characteristics of strength and stretchability at the same time by enhancing the stretchability of the intermediate coupling part, while enhancing the strength of the end-part fastening part of the fastening member that fastens the battery stack body. In particular, it is possible to enhance the resistance of the secondary battery cells to expansion by securing stretchability at the time of expansion while enhancing the coupling strength with the end plate in a fastening member for fastening a battery stack body in which a plurality of secondary battery cells are stacked.

DESCRIPTION OF EMBODIMENTS

A power supply device of an aspect of the present invention may be specified by the following configurations. A power supply device according to an aspect of the present invention includes: a battery stack body in which a plurality of secondary battery cells each including a prismatic exterior can are stacked; a pair of end plates covering both end surfaces of the battery stack body in a stack direction; and a plurality of fastening members each disposed on an opposing side surface of the battery stack body to fasten the end plates to each other. Each of the plurality of fastening members includes an end-part fastening part fixed to the end plate at each of both ends in a longer direction, and an intermediate coupling part coupling between the end-part fastening parts, the intermediate coupling part includes a plurality of rows of coupling bars having a plate shape extending along a side surface of the battery stack body and formed in a wave shape in front view of the fastening member, and at a time of expansion of the secondary battery cells, the coupling bar is elastically deformed in a plane along a side surface of the battery stack body, and the intermediate coupling part is stretched in a stack direction of the secondary battery cells.

Figure 3:
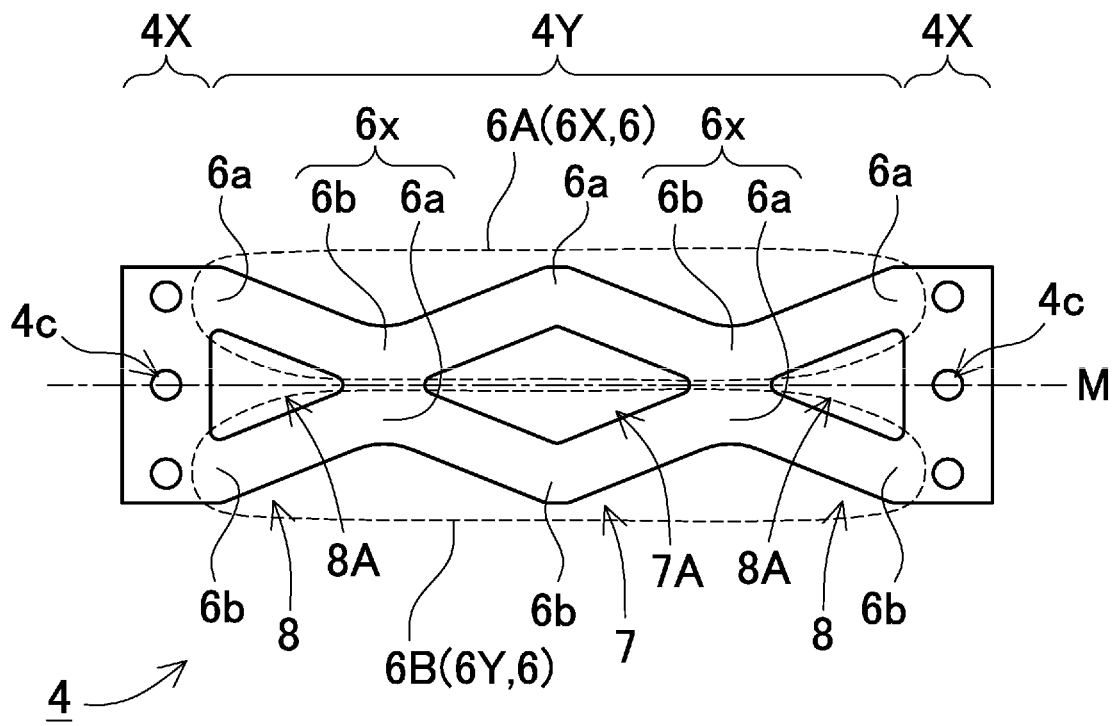
FIG. 3 is an enlarged front view of a fastening member of the power supply device shown in FIG. 2.

In the present description, front view of the fastening member means a state where the fastening member is viewed in a direction intersecting perpendicularly to the plate-shaped fastening member expanding in a planar direction as shown in FIG. 3, the state where the fastening member disposed along the side surface of the battery stack body is viewed from the side surface of the battery stack body.

Figure 1:
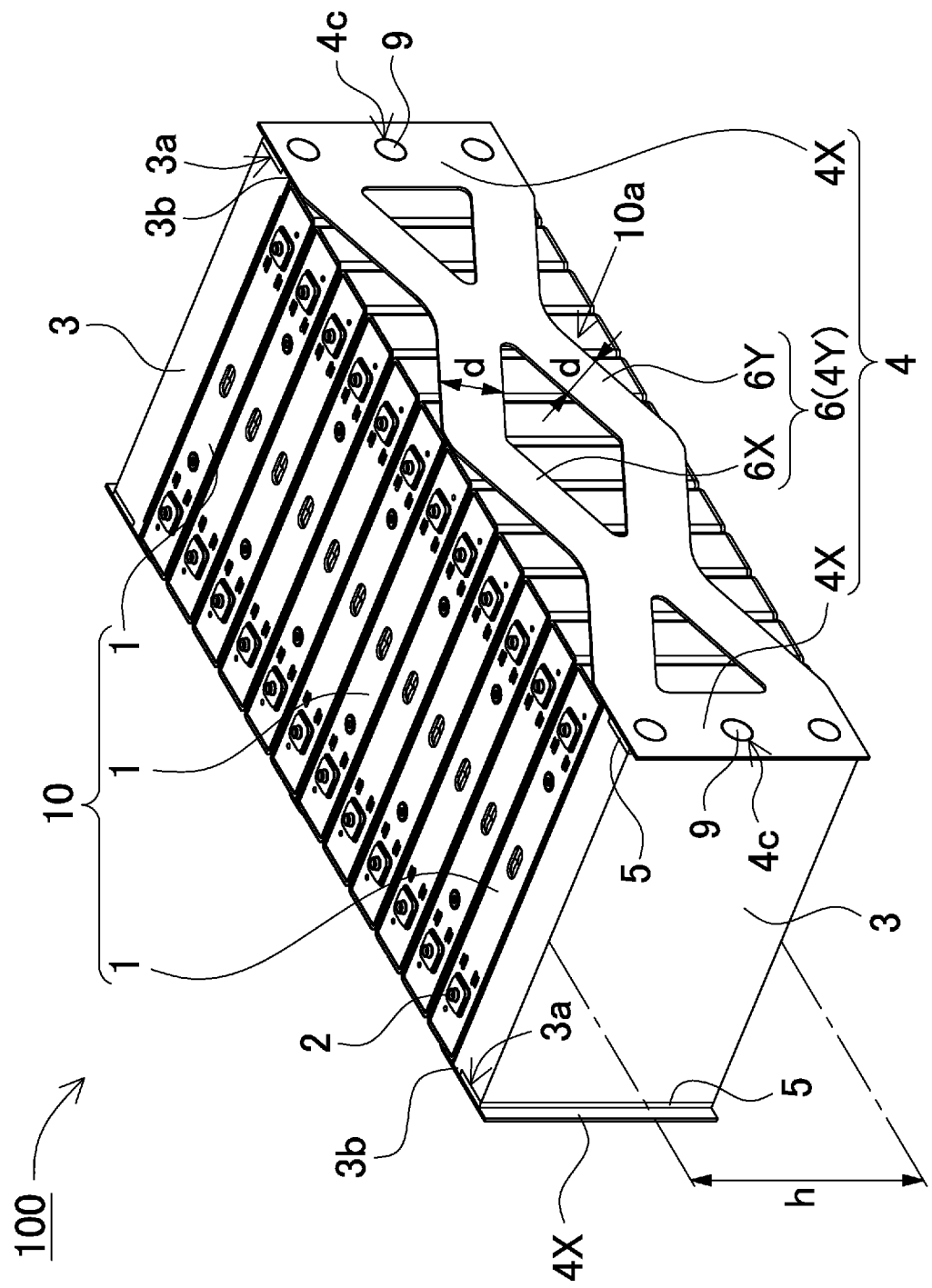
FIG. 1 is a perspective view of a power supply device according to a first exemplary embodiment of the present invention.
Figure 2:
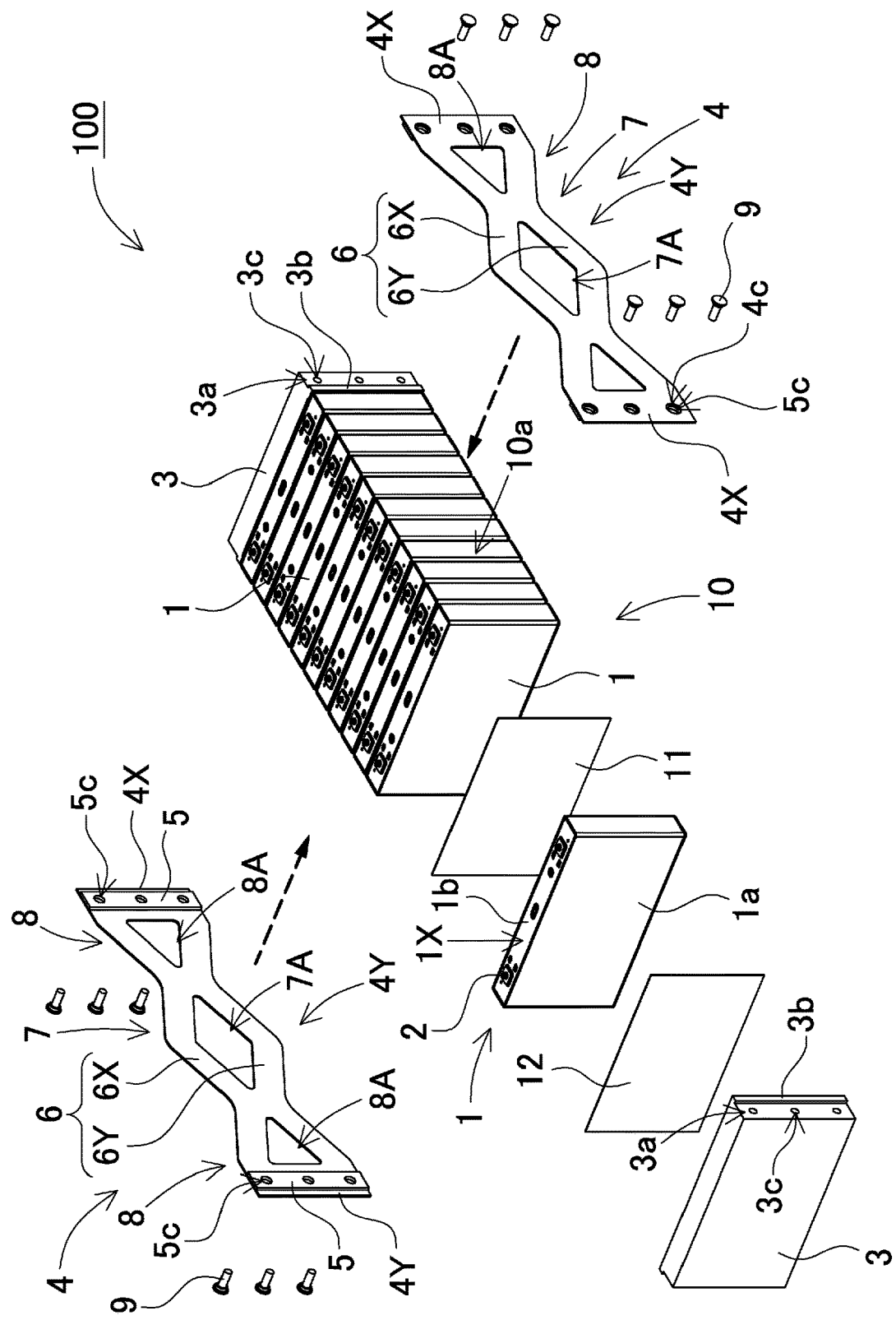
FIG. 2 is an exploded perspective view of the power supply device shown in FIG. 1.

In the present description, the vertical direction is a direction shown in the drawings, the direction in which the can bottom of the exterior can is the lower side, and the sealing plate is the upper side in the secondary battery cell shown in FIGS. 1 and 2.

According to the above configuration, at the time of expansion of the secondary battery cells, the plurality of rows of wave-shaped coupling bars included in the intermediate coupling part of the fastening member are elastically deformed in the plane along the side surface of the battery stack body, whereby the intermediate coupling part is stretched in the stack direction of the secondary battery cells. This can enhance the resistance of the secondary battery cells to expansion. In particular, this fastening member can be stretched in the stack direction of the secondary battery cells by mechanically deforming the coupling bar that is wave shaped in front view. Therefore, the fastening member can be reliably deformed and stretched without difficulty.

In a power supply device of another aspect of the present invention, the intermediate coupling part includes the first coupling bar and the second coupling bar formed in a wave shape vertically symmetrical to each other, and both ends of the first coupling bar and the second coupling bar are coupled to the end-part fastening parts. With the above configuration, by forming the first coupling bar and the second coupling bar into a vertically symmetrical shape, the first coupling bar and the second coupling bar can be stretched in a well-balanced manner to a tensile force acting at the time of expansion of the secondary battery cells.

In a power supply device of another aspect of the present invention, the first coupling bar is disposed to face an upper region of a side surface of the battery stack body, and the second coupling bar is disposed to face a lower region of the side surface of the battery stack body. According to the above configuration, the first coupling bar and the second coupling bar disposed above and below the battery stack body can stretch while vertically dispersing the tensile force acting at the time of expansion of the secondary battery cells.

In a power supply device of another aspect of the present invention, a lower end part of a wave shape of the first coupling bar and an upper end part of a wave shape of the second coupling bar are integrally coupled by an integral coupling part, and the intermediate coupling part is formed of one plate member. With the above configuration, the fastening member can be formed of one plate member, and can be mass-produced easily and at low cost.

In a power supply device of another aspect of the present invention, the intermediate coupling part couples, by a plurality of the integral coupling parts, the first coupling bar and the second coupling bar facing each other to form a closed loop shaped deformation stretch part. With the above configuration, by providing the closed loop shaped deformation stretch part in the intermediate coupling part, it is possible to stretch the fastening member without difficulty by deforming this deformation stretch part.

In a power supply device of another aspect of the present invention, both end parts of the first coupling bar are coupled to an upper end part of the end-part fastening part, both end parts of the second coupling bar are coupled to a lower end part of the end-part fastening part, and coupling holding parts formed of end parts of the first coupling bar and the second coupling bar coupled by the integral coupling part and the end-part fastening part are provided on both sides of the deformation stretch part. According to the above configuration, both ends of the pair of coupling bars are coupled to the upper and lower end parts of the end-part fastening part, and the coupling holding parts formed by the end part of the coupling bar and the end-part fastening part are provided on both sides of the deformation stretch part. This can vertically disperse the tensile force acting on the end-part fastening part via the intermediate coupling part and can prevent shear stress from being concentrated.

In a power supply device of another aspect of the present invention, the coupling bar has a triangular wave shape, and the deformation stretch part has a rhombus shape.

In a power supply device of another aspect of the present invention, the first coupling bar and the second coupling bar are formed of two plate members, and the first coupling bar and the second coupling bar are partially stacked on each other. According to the above configuration, since the first coupling bar and the second coupling bar are formed of two plate members, the fastening member can be more effectively stretched by independently deforming the first coupling bar and the second coupling bar.

In a power supply device of another aspect of the present invention, the first coupling bar and the second coupling bar are stacked in an attitude of intersecting each other at a plurality of positions in front view.

In a power supply device of another aspect of the present invention, the first coupling bar has a central concave shape in front view, both ends of the first coupling bar are coupled to an upper end part of the end-part fastening part, and an intermediate part is disposed to face a lower region of a side surface of the battery stack body, the second coupling bar has a central convex shape in front view, both ends of the second coupling bar are coupled to a lower end part of the end-part fastening part, and an intermediate part is disposed to face an upper region of the side surface of the battery stack body, and the first coupling bar and the second coupling bar intersect each other at a pair of intersections in a stack part, and an intermediate gap is formed between a pair of the intersections.

In a power supply device of another aspect of the present invention, in a plurality of the intersections formed by the first coupling bar and the second coupling bar, an intersection where the second coupling bar is stacked on an outside of the first coupling bar and an intersection where the second coupling bar is stacked on an inside of the first coupling bar are alternately provided. With the above configuration, it is possible to effectively prevent each coupling bar from deforming in a direction of being tilted when stretching due to the tensile force applied at the time of expansion of the secondary battery cells. Therefore, the fastening member can stably be stretched in the stack direction of the battery cells.

In a power supply device of another aspect of the present invention, the coupling bar has a triangular wave shape, and the intermediate gap has a rhombus shape in front view.

In a power supply device of another aspect of the present invention, the intermediate coupling part is formed in a pantograph shape in front view.

In a power supply device of another aspect of the present invention, a shape of the coupling bar is any of a triangular wave, a sine wave, and a trapezoidal wave, or a wave shape in which some of a triangular wave, a sine wave, and a trapezoidal wave are coupled.

In a power supply device of another aspect of the present invention, a width (d) of the coupling bar is set to ⅕ to ⅓ of a height (h) of a side surface of the battery stack body.

In a power supply device of another aspect of the present invention, the fastening member further includes a locking block fixed to the end-part fastening part, the end plate has, on an outer peripheral surface, a fitting portion to which the locking block is guided, and is provided with a stopper portion that abuts on the locking block on a part of the fitting portion close to the battery stack body, and the locking block is locked to the stopper portion to fasten the end plate with the fastening member.

In a power supply device of another aspect of the present invention, the battery stack body includes an intermediate plate stacked in an intermediate part of the plurality of secondary battery cells in a stack direction, the fastening member includes an intermediate fastening part coupled to the intermediate plate in an intermediate between the end-part fastening parts provided at both ends, and the intermediate coupling part is provided between the end-part fastening part and the intermediate fastening part.

Exemplary embodiments of the present invention will be described below with reference to the drawings. However, the exemplary embodiments described below are examples for embodying the technical idea of the present invention, and the present invention is not limited to the following. In addition, the present specification does not specify the members shown in the claims as the members of the embodiment in any way. In particular, unless otherwise specified, dimensions, materials, shapes, relative arrangements, and the like of the components described in the exemplary embodiments are not intended to limit the scope of the present invention thereto, but are merely illustrative examples. Note that sizes, positional relationships, and the like of members illustrated in the drawings may be exaggerated for clarity of description. Furthermore, in the following description, the identical names and reference numerals indicate the identical members or members of the same nature, and detailed description thereof will be omitted as appropriate. Furthermore, each element constituting the present invention may be achieved in an aspect in which a plurality of elements include the identical member and one member serves as the plurality of elements, or conversely, can be achieved with a function of one member being shared by a plurality of members. In addition, some contents described in some examples and exemplary embodiments can be used in another example, exemplary embodiment, and the like.

The power supply device according to the exemplary embodiment is used for various applications such as a power supply that is mounted on an electric vehicle such as a hybrid vehicle or an electric vehicle and supplies electric power to a traveling motor, a power supply that stores generated power of natural energy such as solar power generation and wind power generation, and a power supply that stores midnight electric power. The power supply device according to the exemplary embodiment is used as a power supply suitable for high-power, high-current applications in particular. In the following example, an exemplary embodiment will be described in which the power supply device according to the exemplary embodiment is applied to a power supply device for driving an electric vehicle.

First Exemplary Embodiment

FIG. 1 shows a perspective view of power supply device 100 according to a first exemplary embodiment of the present invention, and FIG. 2 shows an exploded perspective view thereof. Power supply device 100 shown in these figures includes battery stack body 10 in which the plurality of secondary battery cells 1 are stacked, the pair of end plates 3 covering both end surfaces of battery stack body 10 in the stack direction, and the plurality of fastening members 4 fastening end plates 3 to each other.

Battery stack body 10 includes a plurality of secondary battery cells 1 including positive and negative electrode terminals 2, and a bus bar (not illustrated) connected to electrode terminals 2 of the plurality of secondary battery cells 1 and connecting the plurality of secondary battery cells 1 in parallel and in series. The plurality of secondary battery cells 1 are connected in parallel and in series via these bus bars. The secondary battery cell 1 is a chargeable and dischargeable secondary battery. In power supply device 100, the plurality of secondary battery cells 1 are connected in parallel to constitute a parallel battery group, and a plurality of parallel battery groups are connected in series, so that a large number of secondary battery cells 1 are connected in parallel and in series. In power supply device 100 shown in FIGS. 1 and 2, the plurality of secondary battery cells 1 are stacked to form battery stack body 10. The pair of end plates 3 are disposed on both end surfaces of battery stack body 10. End parts of fastening members 4 are fixed to end plates 3, and secondary battery cells 1 in the stacked state are fixed into a pressurized state.

(Secondary Battery Cell 1)

Secondary battery cell 1 is a prismatic battery with a quadrangular outer shape of the main surface, which is a wide surface, and has a thickness smaller than the width. Furthermore, secondary battery cell 1 is a secondary battery that can be charged and discharged, and is a lithium ion secondary battery. However, the present invention does not specify the secondary battery cell to a prismatic battery, and also does not specify the secondary battery cell to a lithium ion secondary battery. As the secondary battery cell, it is also possible to use any chargeable battery such as a non-aqueous electrolyte secondary battery and a nickel-metal hydride secondary battery cell other than the lithium ion secondary battery.

As shown in FIG. 2, in secondary battery cell 1, an electrode body in which positive and negative electrode plates are stacked is housed in exterior can 1a, and filled with an electrolytic solution to airtightly seal exterior can 1a. Exterior can 1a is molded into a bottomed rectangular tubular shape, and an upper opening is airtightly closed with sealing plate 1b of a metal plate. Exterior can 1a is manufactured by deep-drawing a metal plate such as aluminum or an aluminum alloy. Sealing plate 1b is made of a metal plate such as aluminum or an aluminum alloy in the same manner as exterior can 1a. Sealing plate 1b is inserted into an opening of exterior can 1a. A boundary between an outer periphery of sealing plate 1b and an inner periphery of exterior can 1a is irradiated with laser light, and sealing plate 1b is airtightly fixed to exterior can 1a by laser welding.

(Electrode Terminal 2)

In secondary battery cell 1, positive and negative electrode terminals 2 are fixed to both ends of terminal surface 1X with sealing plate 1b, which is a top surface, being used as terminal surface 1X. A projection portion of electrode terminal 2 has a columnar shape. However, the projection portion is not necessarily a column, and may be a polygonal prism or an elliptic column.

The positions of positive and negative electrode terminals 2 to be fixed to sealing plate 1b of secondary battery cell 1 are the positions where the positive electrode and the negative electrode are bilaterally symmetrical. Thus, secondary battery cells 1 are laterally inverted and stacked, and electrode terminals 2 of the positive electrode and the negative electrode that are adjacent and close to each other are connected by a bus bar, so that adjacent secondary battery cells 1 can be connected in series.

(Battery Stack Body 10)

The plurality of secondary battery cells 1 are stacked such that the thickness direction of each secondary battery cell 1 is the stack direction to constitute battery stack body 10. In battery stack body 10, the plurality of secondary battery cells 1 are stacked such that terminal surface 1X on which positive and negative electrode terminals 2 are provided, and sealing plate 1b in FIG. 2 are on the same plane.

In battery stack body 10, insulating spacer 11 may be interposed between secondary battery cells 1 stacked adjacent to each other. Insulating spacer 11 is an insulating material made of resin or the like manufactured in a thin plate shape or a sheet shape. Insulating spacer 11 has a plate shape having substantially the same size as the opposing surface of secondary battery cell 1. Insulating spacer 11 is stacked between secondary battery cells 1 adjacent to each other, whereby adjacent secondary battery cells 1 can be insulated from each other. As the spacer disposed between adjacent secondary battery cells 1, it is also possible to use a spacer having a shape in which a flow path of a cooling gas is formed between secondary battery cells 1 and the spacer. In addition, the surface of the secondary battery cell 1 can be covered with an insulating material. For example, the surface of the exterior can excluding the electrode portion of the secondary battery cell may be thermally welded with a shrink tube such as a polyethylene terephthalate (PET) resin. In this case, the insulating spacer may be omitted. Furthermore, in a power supply device in which a plurality of secondary battery cells are connected in massively parallel and massively series, insulating spacers are interposed between the secondary battery cells connected in series to insulate therebetween. On the other hand, in between the secondary battery cells connected in parallel, a voltage difference does not occur between adjacent exterior cans, and thus the insulating spacer between these secondary battery cells can be omitted.

Furthermore, in power supply device 100 shown in FIG. 2, end plates 3 are disposed on both end surfaces of battery stack body 10. End surface spacer 12 may be interposed between end plate 3 and battery stack body 10 to insulate end plate and battery stack body from each other. End surface spacer 12 can also be an insulating material made of resin or the like manufactured in a thin plate shape or a sheet shape.

In battery stack body 10, a metal bus bar is connected to positive and negative electrode terminals 2 of adjacent secondary battery cells 1, and the plurality of secondary battery cells 1 are connected in parallel and in series via this bus bar. In battery stack body 10, for a plurality of secondary battery cells 1 connected in parallel to each other to constitute a parallel battery group, the plurality of secondary battery cells 1 are stacked such that positive and negative electrode terminals 2 provided at both end parts of terminal surface 1X are in the same right and left orientation, and for secondary battery cells 1 constituting a parallel battery group connected in series to each other, the plurality of secondary battery cells 1 are stacked such that positive and negative electrode terminals 2 provided at both end parts of terminal surface 1X are in opposite right and left orientations. However, the present invention does not specify a number of secondary battery cells constituting the battery stack body and the connection state thereof. The number of secondary battery cells constituting the battery stack body and the connection state thereof can be variously changed including other exemplary embodiments to be described later.

In power supply device 100 according to the exemplary embodiment, in battery stack body 10 in which the plurality of secondary battery cells 1 are stacked on each other, electrode terminals 2 of the plurality of secondary battery cells 1 adjacent to each other are connected by a bus bar, and the plurality of secondary battery cells 1 are connected in parallel and in series. A bus bar holder may be disposed between battery stack body 10 and the bus bar. By using the bus bar holder, a plurality of bus bars can be disposed at fixed positions on the upper surface of the battery stack body while insulating the plurality of bus bars from each other and insulating the terminal surfaces of the secondary battery cells and the bus bars.

(Bus Bar)

A metal plate is cut and processed, and thus the bus bar is manufactured into a predetermined shape. As the metal plate constituting the bus bar, a metal having low electric resistance and light weight, for example, an aluminum plate, a copper plate, or an alloy thereof can be used. However, as the metal plate of the bus bar, other metals having small electric resistance and light weight or alloys thereof can also be used.

(End Plate 3)

As shown in FIGS. 1 and 2, end plates 3 are disposed to both ends of battery stack body 10 and fastened via a pair of right and left fastening members 4 disposed along both side surfaces 10a of battery stack body 10. The outer shape of end plate 3 is substantially equal to or slightly larger than the outer shape of secondary battery cell 1, and is a quadrangular plate member in which fastening members 4 are fixed to the outer peripheral surfaces on both sides to suppress expansion of battery stack body 10. Entire end plate 3 is made of metal such as aluminum, an aluminum alloy, SUS, or iron. However, although not illustrated, the end plate may have a structure in which a metal plate is stacked on plastic, or may be a fiber-reinforced resin molded plate in which reinforcing fibers are entirely embedded.

As shown in the exploded perspective view of FIG. 2, end plates 3 are provided with fitting portions 3a, on outer peripheral surface on both sides, that guide locking blocks 5 in order to reliably couple locking blocks 5 provided on fastening members 4. Furthermore, end plate 3 is provided with stopper portion 3b that abuts on locking block 5 on a part of fitting portion 3a close to battery stack body 10. In other words, both side surfaces of end plate 3 are each provided with stopper portion 3b protruding from the end part close to battery stack body 10 toward fastening member 4, and provided with fitting portion 3a having a step shape. As shown in FIG. 2, end plate 3 is provided with a plurality of female screw holes 3c on the bottom surface of fitting portion 3a.

(Fastening Member 4)

Both ends of fastening member 4 are fixed to the pair of end plates 3 disposed on both end surfaces of battery stack body 10. Fastening members 4 are each disposed on an opposing side surface 10a of battery stack body 10, and fastens battery stack body 10 in the stack direction by the pair of fastening members 4. Fastening member 4 shown in FIGS. 1 to 3 has a flat plate shape along side surface 10a of battery stack body 10, and is integrally formed of one plate member. Fastening member 4 is preferably a metal plate, and a metal plate that withstands strong tensile force is used. As fastening member 4, a metal plate such as a steel plate, iron, an iron alloy, SUS, aluminum, or an aluminum alloy can be used. Fastening member 4, which is a metal plate, is manufactured by cutting one metal plate. This allows fastening member 4 having a specific shape to be simply and easily manufactured. However, fastening member 4 is not limited to a metal plate, and may be a fiber-reinforced resin molded plate in which reinforcing fibers such as carbon fibers are embedded in plastic. Hereinafter, an example in which fastening member 4 is a metal plate that is a steel plate will be described.

Fastening member 4 includes end-part fastening parts 4X fixed to end plates 3 at both ends in the longer direction, and intermediate coupling part 4Y coupling between end-part fastening parts 4X. End-part fastening part 4X is configured to have high strength so as to be reliably fixed to end plate 3, and intermediate coupling part 4Y is configured to have higher stretchability than that of end-part fastening part 4X. Due to this, while end-part fastening part 4X enhances the strength and exerts the fastening force of battery stack body 10, intermediate coupling part 4Y enhances the stretchability, so as to easily deform at the time of expansion of secondary battery cell 1, and thus contradictory characteristics of strength and stretchability are achieved at the same time. Specifically, fastening member 4 is made of a plate member having a predetermined thickness, for example, a metal plate, so that intermediate coupling part 4Y has a unique configuration while the strength of end-part fastening part 4X is secured, thereby enhancing the stretchability.

(End-Part Fastening Part 4X)

End-part fastening parts 4X are disposed at both end parts of the plate member constituting fastening member 4, and have strength for being fixed to end plate 3. Although described in detail later, end-part fastening part 4X shown in FIG. 2 is fixed with locking block 5 for being fixed to end plate 3. Locking block 5 is guided and fixed to fitting portion 3a provided on the outer peripheral surface of end plate 3. However, the end-part fastening part does not necessarily require the locking block, and the end-part fastening part can be directly fixed to the end plate by bolting, welding, or the like.

(Intermediate Coupling Part 4Y)

Intermediate coupling part 4Y includes the plurality of rows of coupling bars 6 having a plate shape extending along side surface 10a of battery stack body 10 and formed in a wave shape in front view shown in FIG. 3. Intermediate coupling part 4Y shown in the figure includes a pair of coupling bars 6 including first coupling bar 6X and second coupling bar 6Y formed in a wave shape vertically symmetrical to each other. In intermediate coupling part 4Y shown in the figure, first coupling bar 6X is upper coupling bar 6A disposed to face an upper region of side surface 10a of battery stack body 10, and second coupling bar 6Y is lower coupling bar 6B disposed to face a lower region of side surface 10a of battery stack body 10. Upper coupling bar 6A and lower coupling bar 6B disposed above and below side surface 10a of battery stack body 10 are respectively formed in shapes that are vertically symmetrical with center line M, which is center line M of side surface 10a of battery stack body 10 and passes through the center in the height, as an axis of symmetry. First coupling bar 6X, which is upper coupling bar 6A, couples the upper portions of the pair of end-part fastening parts 4X located at both ends, and second coupling bar 6Y, which is lower coupling bar 6B, couples the lower portions of the pair of end-part fastening parts 4X located at both ends.

In intermediate coupling part 4Y shown in FIG. 3, the pair of coupling bars 6 are coupled to each other between right and left end-part fastening parts 4X and formed of one metal plate. Specifically, upper coupling bar 6A and lower coupling bar 6B are formed of a single plate member by integrally coupling the facing portions of upper coupling bar 6A and lower coupling bar 6B that are close to each other to provide integral coupling part 6x.

As shown in FIG. 3, intermediate coupling part 4Y couples both end parts of coupling bar 6 to upper and lower end parts of end-part fastening part 4X. Upper coupling bar 6A has wave-shaped upper end parts 6a disposed at both end parts, and couples upper end parts 6a to the upper end parts of right and left end-part fastening parts 4X. Lower coupling bar 6B has wave-shaped lower end parts 6b disposed at both end parts, and couples the lower end parts to the lower end parts of right and left end-part fastening parts 4X. Furthermore, between the pair of end-part fastening parts 4X, lower end part 6b of the wave shape of upper coupling bar 6A and upper end part 6a of the wave shape of lower coupling bar 6B are coupled to each other to form integral coupling part 6x. The structure in which both ends of intermediate coupling part 4Y are coupled to the upper and lower end parts of end-part fastening part 4X as described above can vertically disperse the tensile force acting on end-part fastening part 4X via intermediate coupling part 4Y and can prevent shear stress from being concentrated.

Furthermore, in intermediate coupling part 4Y shown in FIG. 3, upper coupling bar 6A and lower coupling bar 6B coupled to each other form deformation stretch part 7 having a closed loop shape at the central portion. In intermediate coupling part 4Y shown in the figure, both upper coupling bar 6A and lower coupling bar 6B have wave shapes for two cycles, and upper coupling bar 6A and lower coupling bar 6B having wave shapes for one cycle are coupled to each other by two sets of integral coupling parts 6x formed between the pair of end-part fastening parts 4X to form deformation stretch part 7. Coupling bar 6 shown in FIG. 3 has a triangular wave shape, and has a zigzag shape formed by coupling straight portions in an inclined attitude with bent portions. Therefore, at the central portion of intermediate coupling part 4Y, deformation stretch part 7 formed by upper and lower coupling bars 6 has a rhombus shape. Deformation stretch part 7 of a rhombic shape is formed with intermediate opening portion 7A of a rhombic shape at the central portion.

Figure 4:
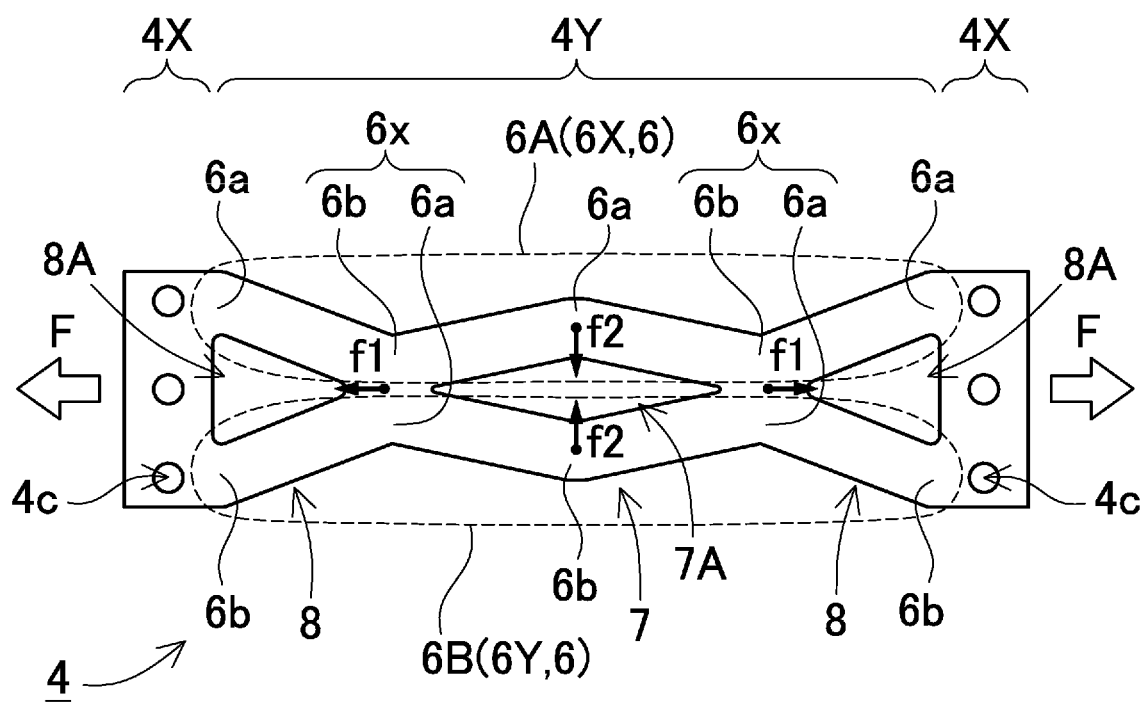
FIG. 4 is a schematic view showing a state in which the fastening member shown in FIG. 3 extends.

When tensile force F acts in the longer direction of fastening member 4 at the time of expansion of secondary battery cells 1, deformation stretch part 7 is elastically deformed into a shape extending in the lateral direction as shown in FIG. 4, and fastening member 4 is stretched. Specifically, when tensile force F acts in the longer direction of fastening member 4, tensile force f1 acts in directions away from each other on the pair of integral coupling parts 6x located at both ends of rhombic deformation stretch part 7. By tensile force f1, compressive force f2 that brings upper end part 6a of upper coupling bar 6A and lower end part 6B of lower coupling bar 6B close to each other acts on deformation stretch part 7. As a result, rhombic deformation stretch part 7 is deformed into a shape crushed in the vertical direction, in other words, a shape stretched to the right and left, and fastening member 4 is stretched. By forming deformation stretch part 7 at the central portion of fastening member 4 in this manner, it is possible to achieve the stretchability against tensile force F acting on end-part fastening parts 4X at both ends and achieve fastening member 4 that can cope with deformation of secondary battery cell 1 to expansion.

In fastening member 4 described above, the strength of end-part fastening part 4X is adjusted by the thickness of the plate member made of a metal plate, and the stretchability of intermediate coupling part 4Y is specified by the width, the shape, and the coupling structure of coupling bar 6. Here, the width (d) of coupling bar 6 can be ⅕ to ⅓ of the height (h) of side surface 10a of battery stack body 10. Although fastening member 4 shown in the figures is provided with one deformation stretch part 7 at the central portion, fastening member 4 may be provided with a plurality of deformation stretch parts. The fastening member including the plurality of deformation stretch parts can further enhance stretchability.

Furthermore, in fastening member 4 shown in FIG. 3, coupling holding parts 8 for coupling deformation stretch part 7 and end-part fastening part 4X are formed on both sides of deformation stretch part 7. In coupling holding part 8 shown in the figure, each side, which is a wave shape for a half cycle of upper coupling bar 6A and lower coupling bar 6B, and end portion coupling portion 4X are coupled in a closed loop shape, and a triangular end portion opening portion 8A is formed at the central portion. Coupling holding part 8 is formed in a triangular shape by two sides of coupling bar 6 and end portion coupling portion 4X, and is a non-deformation portion in which stretch is suppressed even in a state where tensile force F acts. Since triangular coupling holding part 8 can achieve excellent rigidity, it is possible to reliably apply tensile force f1 to integral coupling part 6x at both ends of deformation stretch part 7 formed in the central portion, while exhibiting resistance to tensile force F acting on end-part fastening part 4X. Thus, the structure in which deformation stretch part 7 is provided at the central portion and coupling holding parts 8, which are non-deformation portions, are provided at both end parts can reliably elastically deform deformation stretch part 7 at the central portion and stretch in the stack direction of secondary battery cells 1, while being a structure in which the deformation of coupling holding parts 8 at both end parts is suppressed with respect to tensile force F acting on fastening member 4 at the time of expansion of secondary battery cells 1 and end-part fastening part 4X can be reliably coupled to end plate 3. Thus, it is possible to enhance the strength of end-part fastening parts 4X and ensure the coupling strength to end plate 3, while achieving stretchability by making secondary battery cells 1 easily deformed at the time of expansion.

However, coupling holding parts 8 disposed on both sides of deformation stretch part 7 do not necessarily have to be triangular non-deformation portions, and the end parts of coupling bars 6 can be curved or bent to have a shape slightly deformed by tensile force.

In fastening member 4 described above, the pair of coupling bars 6 constituting intermediate coupling part 4Y are coupled by integral coupling part 6x, so that entire fastening member 4 is formed of one plate member. However, the intermediate coupling part can also separate the pair of coupling bars from each other. In the fastening member of this structure, the pair of end-part fastening parts disposed at both ends are coupled via two independent coupling bars. Also in this case, the intermediate coupling part can be stretched in the stack direction of the secondary battery cells by elastically deforming each wave-shaped coupling bar into a stretched shape. Since this fastening member does not couple the intermediate of the pair of coupling bars by the integral coupling part, the deformation stretch part is not formed at the central portion, and the coupling holding part is not formed at both end parts. This fastening member is stretched by each wave-shaped coupling bar being elastically deformed so as to be expanded. Therefore, the fastening member does not necessarily need to be provided with the deformation stretch part at the central portion, and does not necessarily need to include the coupling holding parts at both end parts.

In fastening member 4 described above, each coupling bar 6 has a triangular wave shape, and the pair of coupling bars 6 are coupled at the intermediate part, so that rhombic deformation stretch part 7 is provided at the central portion, and triangular coupling holding parts 8 are provided on both sides thereof. Therefore, fastening member 4 of this structure is formed in a pantograph shape in front view.

Fastening member 4 is manufactured by cutting one plate member, for example, one metal plate into a predetermined shape, but the fastening member is not necessarily manufactured by one plate member, and can be manufactured by coupling a plurality of plate members.

(Another Example of Fastening Member)

Figure 5:
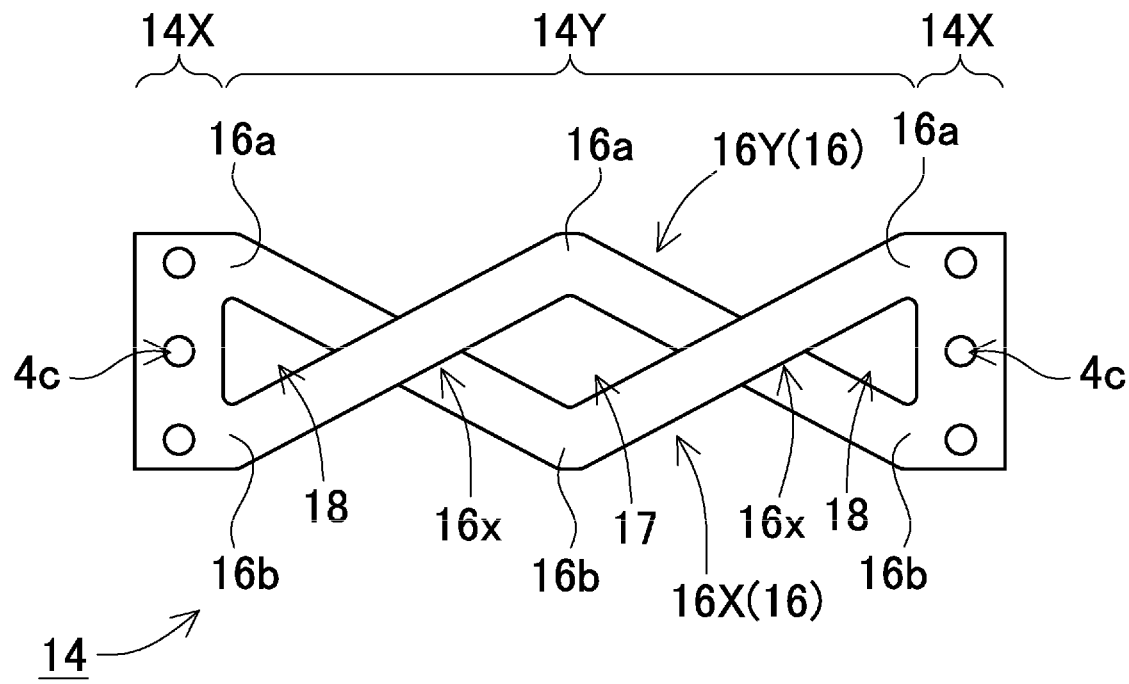
FIG. 5 is an enlarged front view showing another example of the fastening member.
Figure 6:
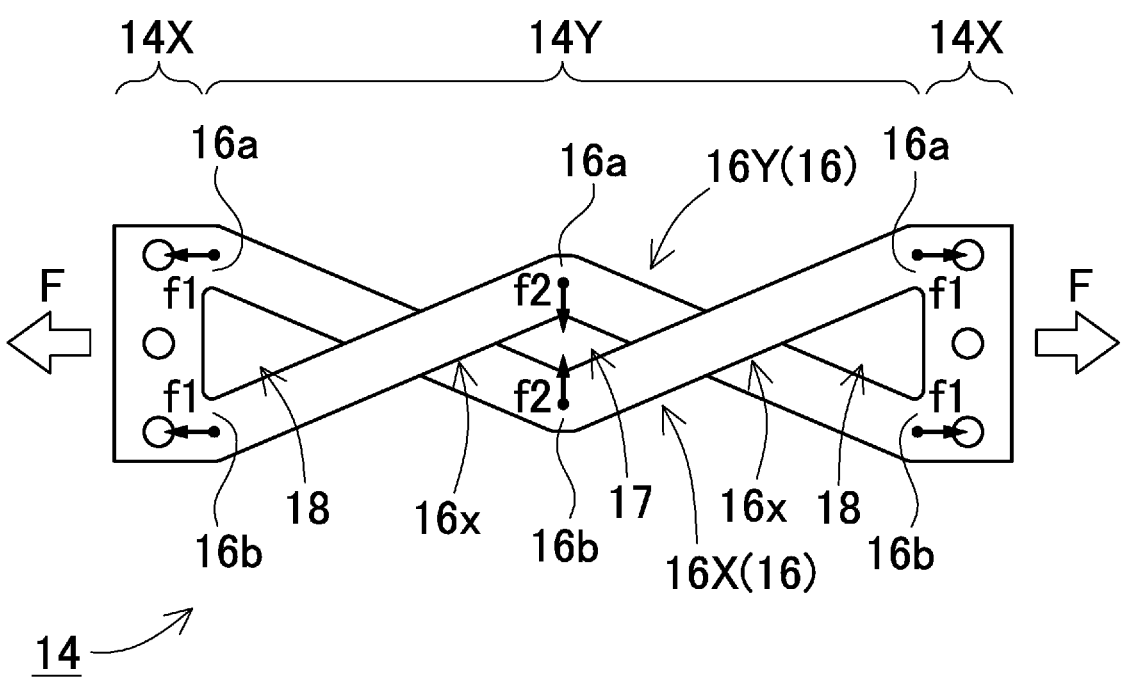
FIG. 6 is a schematic view showing a state in which the fastening member shown in FIG. 5 extends.

Fastening member 14 shown in FIGS. 5 and 6 includes first coupling bar 16X and second coupling bar 16Y in which intermediate coupling part 14Y coupling end-part fastening parts 14X disposed at both ends is formed in a vertically symmetrical wave shape to each other, and both ends of first coupling bar 16X and second coupling bar 16Y are coupled to end-part fastening parts 14X. In intermediate coupling part 14Y in the figure, first coupling bar 16X and second coupling bar 16Y are formed of two plate members, and a part of first coupling bar 16X and a part of second coupling bar 16Y are stacked on each other in the intermediate part.

In intermediate coupling part 14Y shown in FIG. 5, both first coupling bar 16X and second coupling bar 16Y have a wave shape for one cycle. First coupling bar 16X shown in FIG. 5 has a central concave shape in front view, both ends of first coupling bar 16X are coupled to end-part fastening part 14X, and an intermediate part is disposed to face a lower region of a side surface of the battery stack body. In first coupling bar 16X of FIG. 5, wave-shaped upper end parts 16a are disposed at both end parts, and upper end parts 16a are coupled to the upper end parts of right and left end-part fastening parts 14X to lower the intermediate part including lower end part 16b to the height of the lower end of end-part fastening part 14X. Second coupling bar 16Y shown in FIG. 5 has a central convex shape in front view, both ends of second coupling bar 16Y are coupled to end-part fastening part 14X, and an intermediate part is disposed to face an upper region of the side surface of the battery stack body. In second coupling bar 16Y of FIG. 5, wave-shaped lower end parts 16b are disposed at both end parts, and lower end parts 16b are coupled to the lower end parts of right and left end-part fastening parts 14X to raise the intermediate part including upper end part 16a to the height of the upper end of end-part fastening part 14X. First coupling bar 16X and second coupling bar 16Y having the above-described shapes are stacked in an attitude intersecting each other at a plurality of positions in front view shown in FIG. 5. First coupling bar 16X and second coupling bar 16Y shown in the figure are stacked on each other at a pair of intersections 16x.

In intermediate coupling part 14Y shown in FIG. 5, of the pair of intersections 16x formed by first coupling bar 16X and second coupling bar 16Y, second coupling bar 16Y is stacked on the outside of first coupling bar 16X for one (left side in the figure) intersection 16x, and second coupling bar 16Y is stacked on the inside of first coupling bar 16X for the other (right side in the figure) intersection 16x. When each coupling bar 16 stretches due to tensile force F applied at the time of expansion of secondary battery cells 1, fastening member 14 of this structure can effectively prevent coupling bar 16 from deforming in the direction of being tilted by being stacked in opposite attitudes to each other at the pair of intersections 16x. This is because the forces acting in the tilting direction cancel each other by intersections 16x stacked in the opposite attitude. Therefore, in the plurality of intersections 16x formed by first coupling bar 16X and second coupling bar 16Y, it is preferable to alternately provide intersection 16x in which second coupling bar 16Y is stacked outside first coupling bar 16X and intersection 16x in which second coupling bar 16Y is stacked inside first coupling bar 16X. However, the plurality of intersections formed by the first coupling bar and the second coupling bar may be stacked such that one coupling bar is always on the same side with respect to the other coupling bar. This structure can effectively stretch by reducing frictional resistance between the coupling bars stacked on each other at the intersection.

Furthermore, in intermediate coupling part 14Y shown in FIG. 5, intermediate gap 17 is formed at the center portion by first coupling bar 16X and second coupling bar 16Y, which are stacked to intersect each other. In intermediate coupling part 14Y shown in the figure, first coupling bar 16X and second coupling bar 16Y having a wave shape of substantially ½ cycle are lapped with each other by two sets of intersections 16x formed between the pair of end-part fastening parts 14X to form intermediate gap 17. Coupling bar 16 shown in FIG. 5 has a triangular wave shape, and has a zigzag shape formed by coupling straight portions in an inclined attitude with bent portions. Therefore, at the central portion of intermediate coupling part 14Y, intermediate gap 17 formed by V-shaped first coupling bar 16X having a central concave shape and inverted V-shaped second coupling bar 16Y having a central convex shape has a rhombus shape. In fastening member 14 shown in FIG. 5, on both sides of the pair of intersections 16x, the end parts of first coupling bar 16X and second coupling bar 16Y and end-part fastening parts 14X form triangular end part gap 18.

When tensile force F acts in the longer direction of fastening member 14 at the time of expansion of secondary battery cells 1, fastening member 14 is elastically deformed into a shape extending in the lateral direction as shown in FIG. 6, and fastening member 14 is stretched. Specifically, when tensile force F acts in the longer direction of fastening member 14, tensile force f1 acts on both ends of V-shaped first coupling bar 16X and both ends of inverted V-shaped second coupling bar 16Y in directions away from each other. By tensile force f1, V-shaped first coupling bar 16X and inverted V-shaped second coupling bar 16Y are both elastically deformed into an expanded shape, and fastening member 14 is stretched. In this state, as shown in FIG. 6, in the pair of coupling bars 16, due to compressive force f2 acting on upper end part 6a of first coupling bar 16X and lower end part 6b of second coupling bar 16Y, the gap between upper end part 6a and lower end part 6b is narrowed, and rhombus-shaped intermediate gap 17 formed by V-shaped first coupling bar 16X and inverted V-shaped second coupling bar 16Y is contracted. Thus, by elastically deforming first coupling bar 16X and second coupling bar 16Y, which have wave shapes of opposite phases stacked on each other, in the direction of expanding, it is possible to achieve stretchability against tensile force F acting on end-part fastening parts 14X at both ends, and to achieve fastening member 14 that can cope with deformation against expansion of secondary battery cell 1.

Figure 7:
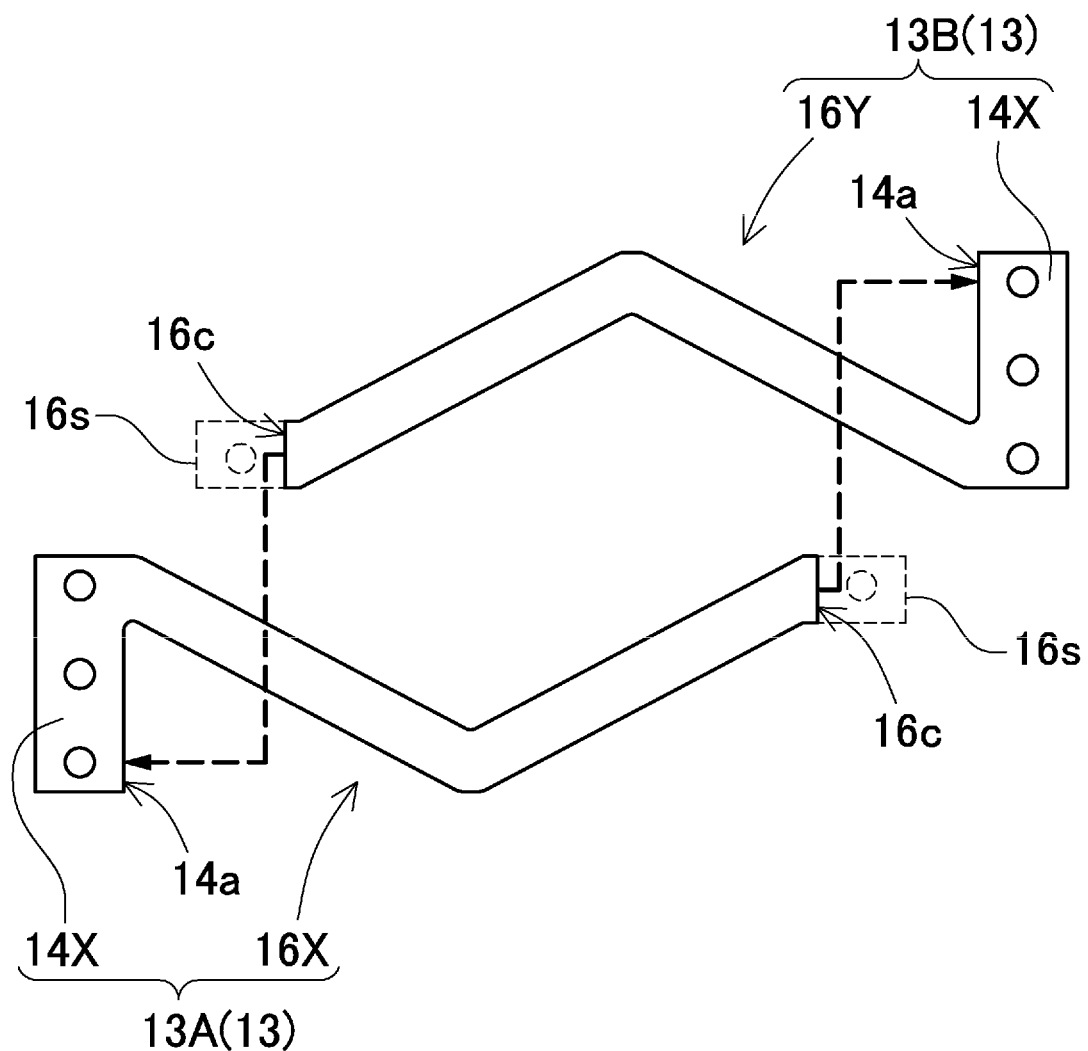
FIG. 7 is an exploded front view showing an example of a method of manufacturing the fastening member shown in FIG. 5.

As shown in FIG. 7, fastening member 14 described above can be manufactured by coupling two plate members 13 including first plate 13A and second plate 13B. In first plate 13A in the figure, first coupling bar 16X is integrally coupled to the first end part (the upper end part in the figure) of end-part fastening part 14X. In second plate 13B, second coupling bar 16Y is integrally coupled to the second end part (the lower end part in the figure) of end-part fastening part 14X. In fastening member 14, by rotating one of the pair of plate members 13 by 180 degrees while mass-producing by cutting or the like a large amount of first plate 13A and second plate 13B as plate members 13 having the same shape, first plate 13A and second plate 13B in which coupling bars 16 are disposed in a vertically symmetrical attitude can be obtained.

First plate 13A and second plate 13B are coupled to each other with the tip end of first coupling bar 16X being coupled to the first end part (the upper end part in the figure) of end-part fastening part 14X of second plate 13B and the tip end of second coupling bar 16Y being coupled to the second end part (the lower end part in the figure) of end-part fastening part 14X of first plate 13A. At this time, the coupling portions can be joined to each other by welding. Tip end surface 16c of coupling bar 16 and side surface 14a of end-part fastening part 14 are linearly welded and firmly joined by laser welding or the like in a state of abutting on each other. However, as indicated by a chain line in the figure, first plate 13A and second plate 13B can be joined by providing coupling piece 16s at the tip of coupling bar 16 and stacking coupling piece 16s on the end part of end-part fastening part 14X. In this case, coupling piece 16s of coupling bar 16 can be welded or mechanically joined to end-part fastening part 14X.

Figure 8:
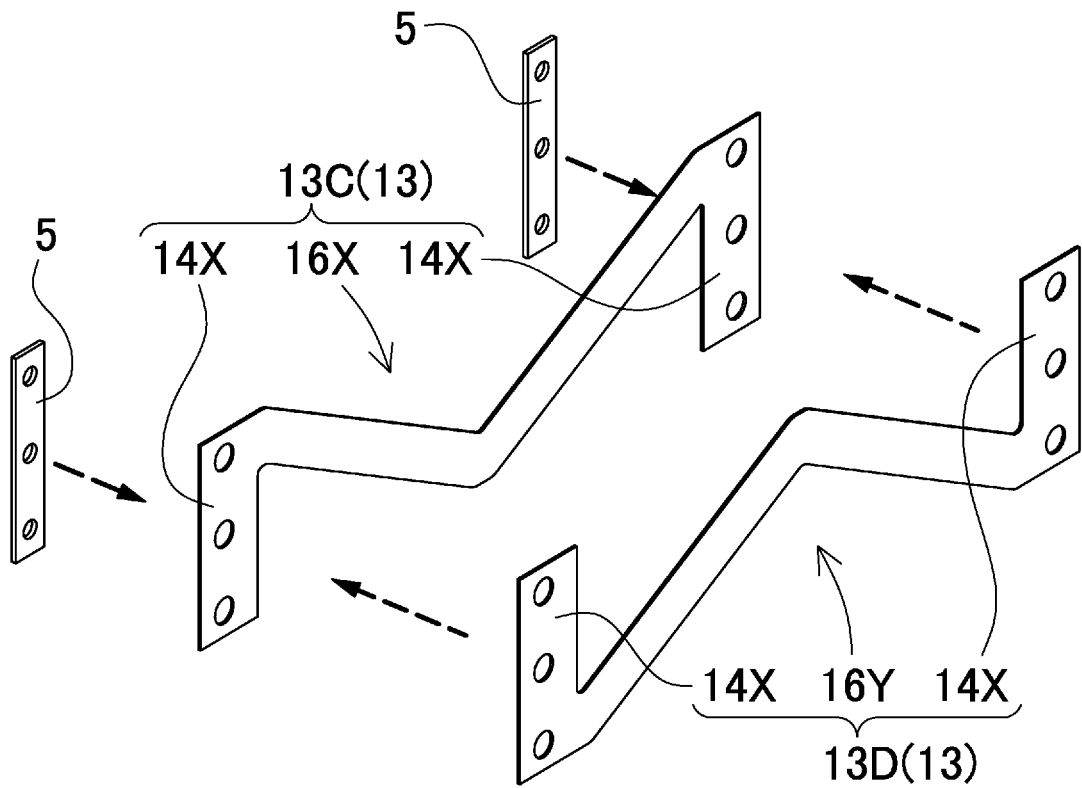
FIG. 8 is an exploded perspective view showing another example of the method of manufacturing the fastening member shown in FIG. 5.

Furthermore, as shown in FIG. 8, fastening member 14 can also be manufactured by stacking two plate members 13 including first plate 13C and second plate 13D. In first plate 13C in the figure, the pair of end-part fastening parts 14X are coupled by first coupling bar 16X. In second plate 13D, the pair of end-part fastening parts 14X are coupled by second coupling bar 16Y. First plate 13C and second plate 13D are overlapped and coupled such that end-part fastening parts 14X at both ends coincide with each other, whereby first coupling bar 16X and second coupling bar 16Y are stacked in an attitude of lapping at the central portion. End-part fastening parts 14X stacked on each other are joined to each other by welding or adhesion. First coupling bar 16X and second coupling bar 16Y stacked in a lapped state are not joined at the intersection and can freely move relative to each other.

Fastening member 14 can also be manufactured by stacking on each other as first plate 13C and second plate 13D in which coupling bars 16 are disposed in a vertically symmetrical attitude by inverting one of the pair of plate members 13 at the up and down or inverting the front and back while mass-producing by cutting or the like first plate 13C and second plate 13D as plate members 13 having the same shape. In fastening member 14 of this structure, since coupling bar 16 and end-part fastening part 14X can be integrally manufactured with one plate member 13, the coupling strength between coupling bar 16 and end-part fastening part 14X can be enhanced. Since the friction at the intersection of first coupling bar 16X and second coupling bar 16Y stacked on each other as intermediate coupling part 14Y can be reduced, fastening member 14 can be efficiently stretched.

In fastening member 14 described above, coupling bar 16 has a wave shape for one cycle, but coupling bar 16 may have a wave shape larger than one cycle. For example, in the fastening member, the pair of coupling bars may have a wave shape for 1.5 cycles. In this fastening member, one end of the coupling bar is coupled to the upper end part of the end-part fastening part, the other end is coupled to the lower end part of the end-part fastening part, and the pair of coupling bars are stacked by three intersections, so that two intermediate gaps are formed between the adjacent intersections. This fastening member can further enhance stretchability by providing a plurality of intermediate gaps.

In fastening member 14 described above, each coupling bar 16 has a triangular wave shape, and the plurality of intersections 16x are provided by stacking the pair of coupling bars 16 at the intermediate part, so that rhombic intermediate gap 17 is provided at the central portion, and triangular end part gaps 18 are provided on both sides thereof. Therefore, fastening member 14 of this structure is formed in a pantograph shape in front view.

Although coupling bar 6, 16 has a wave shape of a triangular wave in front view, the coupling bar does not necessarily need to have a triangular wave, and may have a sine wave or a trapezoidal wave. Alternatively, the coupling bar may have a wave shape in which some of a triangular wave, a sine wave, and a trapezoidal wave are combined. Furthermore, in addition to the above wave shapes, the coupling bar may have a curved line such as a circle, an ellipse, a cycloidal curve, or an arch curve, or a wave shape in which some of them are combined. That is, the coupling bar is a plate member having a path bent in a wave shape or curved in a wave shape in front view. The coupling bar can be elastically deformed to a state where the wave shape is stretched in both end directions in a state where a tensile force acts in both end directions, and can have all shapes stretched by the elastic deformation.

Therefore, in the fastening member having a shape formed by coupling, by the integral coupling part, the coupling bars having these wave shapes, the deformation stretch part formed in the central portion is formed in various shapes other than a rhombus shape, for example, a substantially elliptical shape, a substantially hexagonal shape, a teardrop shape in which both ends are tapered, and the like. However, in the deformation stretch part having any shape, in a state where a tensile force acts in both end directions, the upper and lower portions of the central portion are deformed in a direction of approaching each other, and the integral coupling parts at both ends are deformed into a shape of being stretched in both end directions, thereby achieving stretchability of the fastening member.

(Locking Block 5)

As shown in FIG. 2, locking block 5 is made of a plate-like or prismatic metal having a predetermined thickness. Locking block 5 shown in the figure has a plate shape formed to be thicker than fastening member 4, and is joined and fixed to the inner side surface of end-part fastening parts 4X at both ends in the longer direction of fastening member 4. Locking block 5 protrudes toward the outer peripheral surface of end plate 3 in a state of being fixed to the inner side surface of end-part fastening part 4X. The pair of locking blocks 5 fixed to both end parts of fastening member 4 are guided to fitting portions 3a provided on the outer surface of end plates 3, and have a size and a shape that can be locked to stopper portion 3b. In a state where fastening member 4 is coupled to end plate 3, locking block 5 is guided to fitting portion 3a and locked to stopper portion 3b, and fastening members 4 are disposed at fixed positions on both sides of battery stack body 10.

As locking block 5, a metal plate such as iron, preferably a steel plate, iron, an iron alloy, SUS, aluminum, an aluminum alloy, or the like can be used. Fastening member 4 and locking block 5 are preferably made of the same kind of metal. This can enhance the coupling strength while easily welding fastening member 4 and locking block 5. However, in locking block 5, fastening member 4 and locking block 5 can be formed of dissimilar metals. That is, locking block 5 and fastening member 4 made of dissimilar metals can be joined and coupled to each other. In this case, it is possible to enhance strength, for example, by using an iron-based metal for the locking block, and to enhance stretchability by using an aluminum-based metal plate for the fastening member. Furthermore, the fastening member is not limited to a metal plate, and may be a fiber-reinforced resin molded plate in which reinforcing fibers such as carbon fibers are embedded in plastic. In this case, the locking block can be fixed to the fastening member by mechanical joining such as rivets.

(Through Hole 4c)

As shown in the exploded perspective view of FIG. 2, locking block 5 is guided to fitting portion 3a of end plate 3 and locked to stopper portion 3b, and is fixed to the outer peripheral surface of end plate 3 via a plurality of bolts 9. In order to fix locking block 5 to fitting portion 3a with bolts 9 in a state where end plate 3 is fastened, fastening member 4 and locking block 5 shown in FIG. 2 are provided with through holes 4c, 5c through which bolts 9 are inserted. Bolts 9 penetrate fastening member 4 and locking block 5 and are screwed into female screw holes 3c of end plate 3 to fix locking block 5 to end plate 3. Power supply device 100 of this fixing structure can reliably block positional displacement of locking block 5 by both bolts 9 and stopper portion 3b while reliably fixing locking block 5 to end plate 3. This is because bolts 9 press and fix locking block 5 against the bottom surface of fitting portion 3a, stopper portion 3b can reliably block positional displacement, and the axial force of bolts 9 can also block the positional displacement.

Fastening member 4 is fixed to end plate 3 by inserting bolts 9 into through hole 4c and screwing bolts 9 into female screw holes 3c provided in end plate 3. In fastening member 4 and locking block 5 shown in the figure, through holes 4c, 5c are opened so as to coincide with female screw holes 3c provided in end plate 3 in a state where locking block 5 is guided to fitting portion 3a. Fastening member 4 and locking block 5 in FIG. 2 are provided with the plurality of through holes 4c, 5c opened at predetermined intervals in an extension direction of locking block 5 that is a vertical direction in the figure. Accordingly, the plurality of female screw holes 3c of end plate 3 are also formed along the side surface of end plate 3.

As shown in FIG. 1, fastening member 4 is disposed at a fixed position in a state where locking block 5 is guided to fitting portion 3a of end plate 3 and locking block 5 is locked to stopper portion 3b. Furthermore, locking block 5 is fixed to end plate 3 via bolts 9, and the pair of end plates 3 are coupled by fastening member 4.

As described above, power supply device 100 in which the large number of secondary battery cells 1 are stacked is configured to bind a plurality of secondary battery cells 1 by coupling, by fastening members 4, end plates 3 disposed at both ends of battery stack body 10 including the plurality of secondary battery cells 1. By binding the plurality of secondary battery cells 1 via highly rigid end plate 3 and fastening member 4, it is possible to suppress expansion, deformation, relative movement, malfunction due to vibration, and the like of secondary battery cells 1 due to charging and discharging and deterioration.

(Insulating Sheet)

Although not illustrated, an insulating sheet is interposed between fastening member 4 and battery stack body 10. The insulating sheet is made of a material having an insulating property, e.g., resin, and can insulate fastening member 4 made of metal from secondary battery cells 1. Thus, by insulating fastening member 4 and battery stack body 10 with the insulating sheet, unintended conduction between secondary battery cells 1 and fastening member 4 can be avoided.

Power supply device 100 described above is assembled in the following process.

(1) A predetermined number of secondary battery cells 1 are stacked in the thickness of secondary battery cells 1 with insulating spacers 11 interposed therebetween to form battery stack body 10.
(2) End plates 3 are disposed at both ends of battery stack body 10, and the pair of end plates 3 are pressed from both sides by a press (not illustrated). Battery stack body 10 is pressurized by end plates 3 at a predetermined pressure, and secondary battery cells 1 are compressed and held in a pressurized state.
(3) In a state where battery stack body 10 is pressurized by end plates 3, fastening members 4 are coupled and fixed to the pair of end plates 3. Fastening member 4 is disposed such that locking blocks 5 at both end parts are guided to fitting portions 3a of the pair of end plates 3, and fastening member 4 is fixed by screwing bolts 8 penetrating locking blocks 5 into female screw holes 3c of end plates 3. After fixing, the pressurized state is released. Accordingly, by the tensile force acting on fastening member 4, locking block 5 is held in a state of being locked to stopper portion 3b of end plate 3.
(4) Opposing electrode terminals 2 of secondary battery cells 1 adjacent to each other are coupled to each other by bus bars (not illustrated) on both sides of battery stack body 10. The bus bar is fixed to electrode terminals 2 to connect battery cells 1 in series, or in series and in parallel. The bus bar is welded or screwed to electrode terminals 2 to be fixed to electrode terminals 2.

Second Exemplary Embodiment

Figure 9:
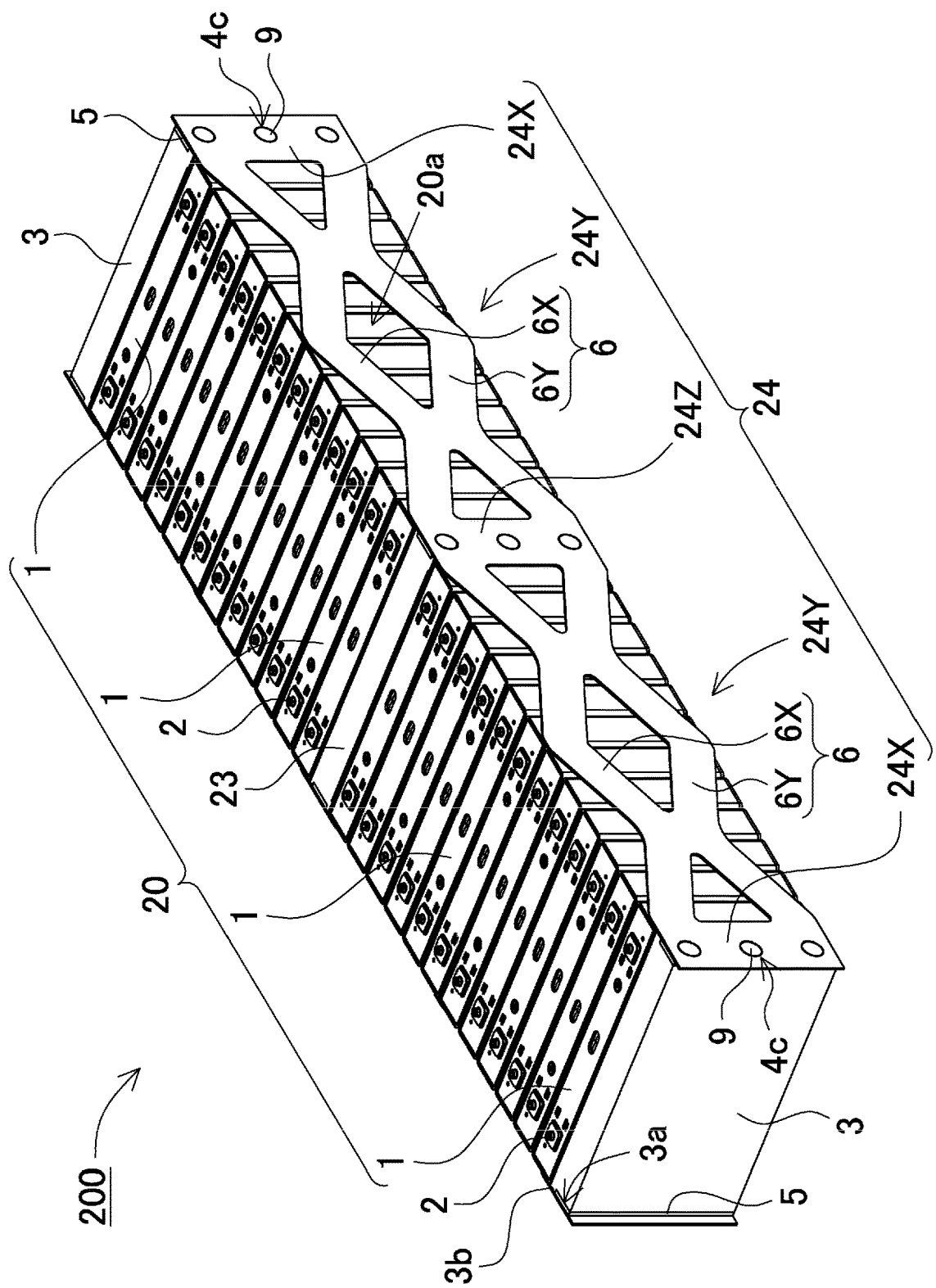
FIG. 9 is a perspective view of a power supply device according to a second exemplary embodiment of the present invention.

Furthermore, power supply device 200 shown in FIG. 9 includes battery stack body 20 in which a larger number of secondary battery cells 1 are stacked, and the pair of end plates 3 disposed on both end surfaces of battery stack body 20 are coupled by fastening member 24 formed to be longer than fastening member 4 of the above-mentioned exemplary embodiment. In power supply device 200 shown in the figure, secondary battery cells 1 twice as many as those of power supply device 100 described above are stacked to form battery stack body 20. Furthermore, in battery stack body 20 shown in the figure, intermediate plate 23 is stacked on an intermediate part in the stack direction of the plurality of secondary battery cells 1 to be stacked. Fastening members 24 are disposed on both sides of battery stack body 20 in an attitude to face side surface 20a. Fastening member 24 has an overall length substantially equal to the overall length of battery stack body 20, i.e., has a length approximately twice the overall length of fastening member 4 used in power supply device 100 of the above-described exemplary embodiment. Fastening member 24 includes, in the intermediate part, intermediate fastening part 24Z coupled to intermediate plate 23. Fastening member 24 shown in the figure includes intermediate coupling part 24Y between each end-part fastening part 24X at both ends and intermediate fastening part 24Z, and each intermediate coupling part 2Y can independently stretch in the stack direction of battery stack body 20. Power supply device 200 of this structure has a structure in which battery stack body 20 in which a large number of secondary battery cells 1 are stacked is fastened by the pair of fastening members 24, and has a structure in which intermediate plate 23 stacked in the intermediate part of battery stack body 20 is coupled to intermediate fastening part 24Z provided in the intermediate part of fastening member 24, so that intermediate coupling parts 24Y provided on both sides of fastening member 24 can absorb deformation due to expansion of secondary battery cells 1 stacked on both sides of intermediate plate 23. Similarly to fastening member 4 described above, fastening member 24 of this shape also achieves stretchability of secondary battery cells 1 in the stack direction by wave-shaped coupling bar 6 constituting each intermediate coupling part 24.

The power supply device described above can be used as a power supply for a vehicle that supplies electric power to a motor that causes an electric vehicle to travel. As an electric vehicle on which the power supply device is mounted, an electric vehicle such as a hybrid vehicle or a plug-in hybrid vehicle that travels by both an engine and a motor, or an electric vehicle that travels only by a motor can be used, and is used as a power supply for these vehicles. Note that, in order to obtain power for driving the vehicle, an example will be described in which a large number of the above-described power supply devices are connected in series or in parallel, and large-capacity, high-output power supply device 100 to which a necessary control circuit is further added is constructed.

(Power Supply Device for Hybrid Vehicle)

Figure 10:
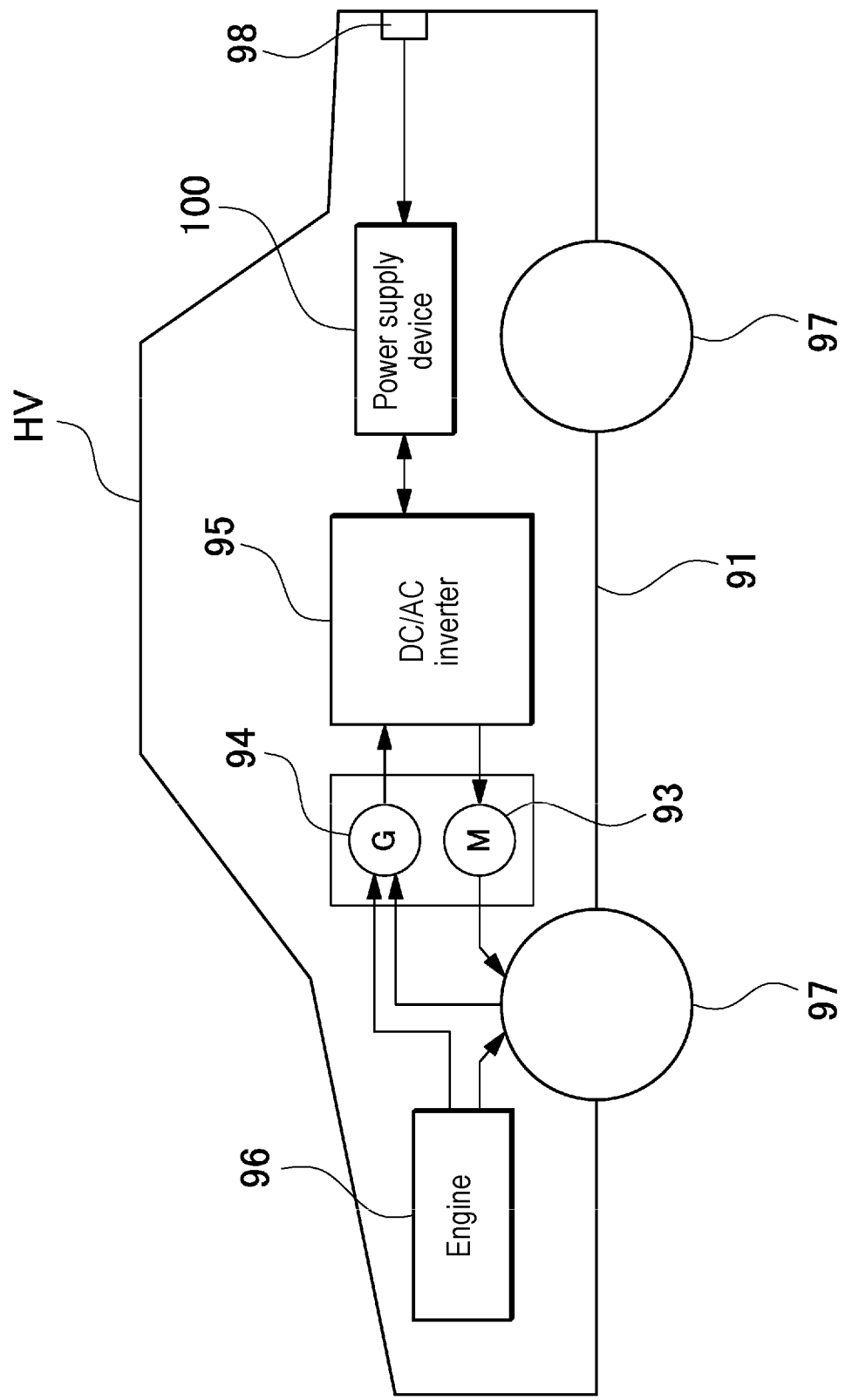
FIG. 10 is a block diagram showing an example in which the power supply device is mounted on a hybrid vehicle traveling by an engine and a motor.

FIG. 10 shows an example in which the power supply device is mounted on a hybrid vehicle that travels by both an engine and a motor. Vehicle HV on which the power supply device illustrated in this drawing is mounted includes vehicle body 91, engine 96 and traveling motor 93 that cause vehicle body 91 to travel, wheels 97 driven by engine 96 and traveling motor 93, power supply device 100 that supplies power to motor 93, and generator 94 that charges a battery of power supply device 100. Power supply device 100 is connected to motor 93 and generator 94 via DC/AC inverter 95. Vehicle HV travels by both motor 93 and engine 96 while charging and discharging the battery of power supply device 100. Motor 93 is driven to cause the vehicle to travel in an area with poor engine efficiency, for example, at the time of acceleration or low speed traveling. Motor 93 is driven by power supplied from power supply device 100. Generator 94 is driven by engine 96 or by regenerative braking when braking the vehicle to charge the battery of power supply device 100. As shown in FIG. 10, vehicle HV may include charging plug 98 for charging power supply device 100. Power supply device 100 can be charged by connecting charging plug 98 to an external power supply.

(Power Supply Device for Electric Vehicle)

Figure 11:
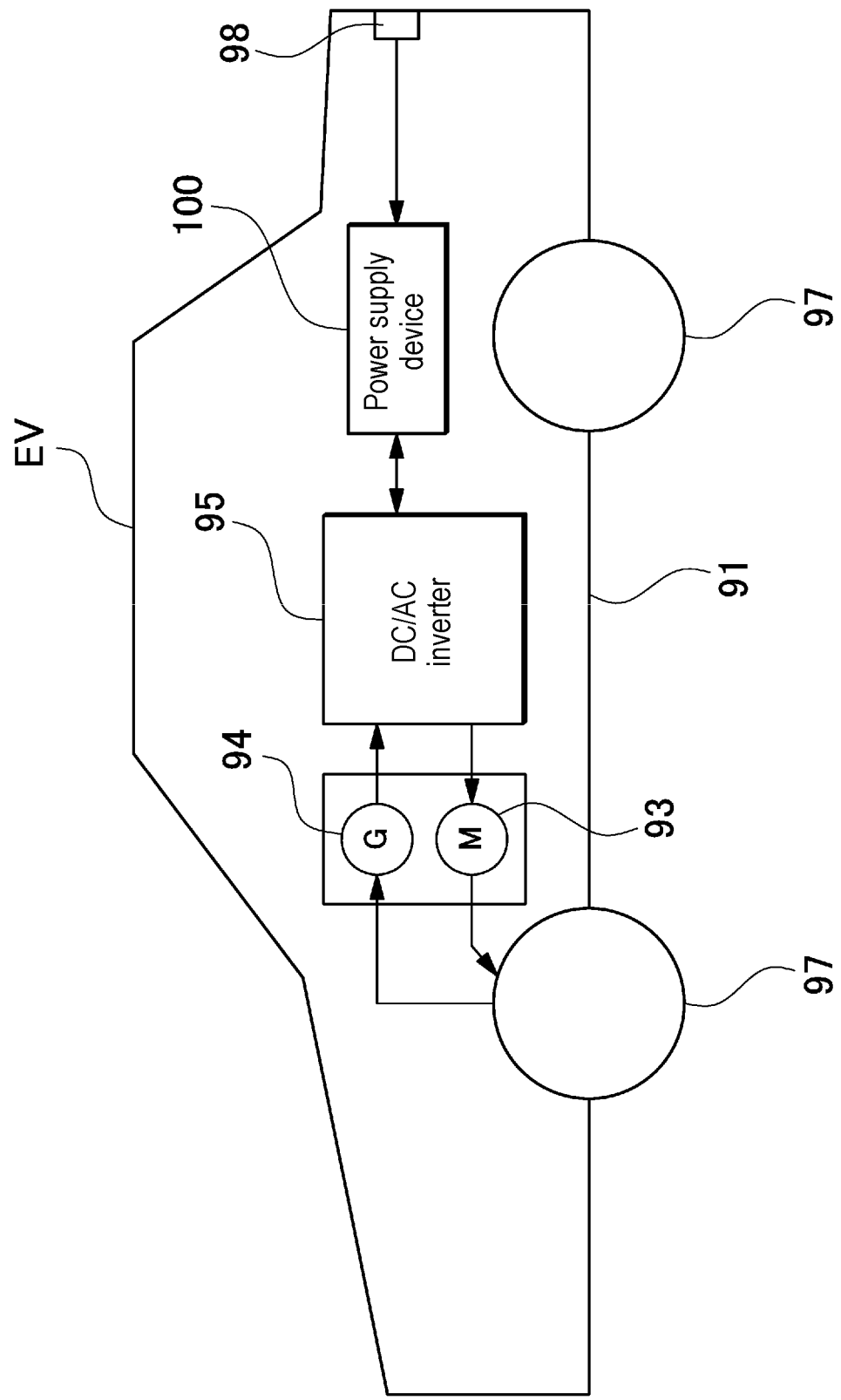
FIG. 11 is a block diagram showing an example in which the power supply device is mounted on an electric vehicle traveling only by a motor.

FIG. 11 shows an example in which the power supply device is mounted on an electric vehicle that travels only by a motor. Vehicle EV on which the power supply device illustrated in this drawing is mounted includes vehicle body 91, traveling motor 93 that causes vehicle body 91 to travel, wheels 97 driven by motor 93, power supply device 100 that supplies power to motor 93, and generator 94 that charges the battery of power supply device 100. Power supply device 100 is connected to motor 93 and generator 94 via DC/AC inverter 95. Motor 93 is driven by power supplied from power supply device 100. Generator 94 is driven by the energy at the time of regenerative braking of vehicle EV to charge the battery of power supply device 100. In addition, vehicle EV includes charging plug 98, and power supply device 100 can be charged by connecting charging plug 98 to an external power supply.

(Power Supply Device for Power Storage Device)

Figure 12:
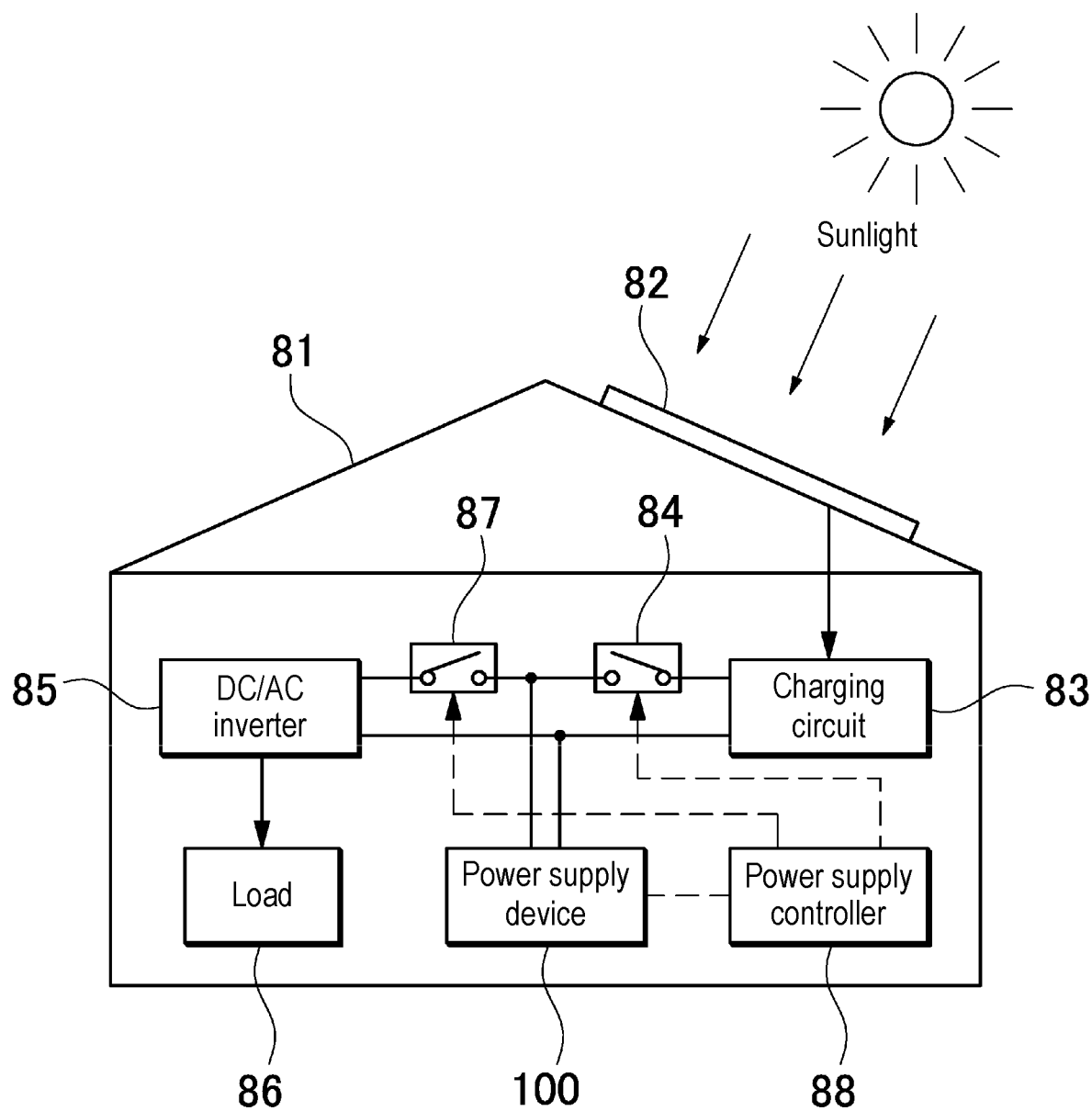
FIG. 12 is a block diagram showing an example of application to a power supply device for power storage.

Furthermore, the present invention does not specify the application of the power supply device as the power supply for a motor that drives a vehicle. The power supply device according to the exemplary embodiments can also be used as a power supply for a power storage device that stores electricity by charging a battery with electric power generated by solar power generation, wind power generation, or the like. FIG. 12 shows a power storage device that stores electricity by charging the battery of power supply device 100 with solar cell 82.

The power storage device shown in FIG. 12 charges the battery of power supply device 100 with electric power generated by solar cell 82 disposed on a roof, a rooftop, or the like of building 81 such as a house or a factory. This power storage device charges the battery of power supply device 100 by charging circuit 83 using solar cell 82 as a charging power source, and then supplies electric power to load 86 via DC/AC inverter 85. Therefore, this power storage device includes a charging mode and a discharging mode. In the power storage device shown in the figure, DC/AC inverter 85 and charging circuit 83 are connected to power supply device 100 via discharging switch 87 and charging switch 84, respectively. ON/OFF of discharging switch 87 and charging switch 84 is switched by power supply controller 88 of the power storage device. In the charging mode, power supply controller 88 switches charging switch 84 to on and switches discharging switch 87 to off to permit charging from charging circuit 83 to power supply device 100. When the charging is completed and the battery is fully charged, or in a state where a capacity equal to or greater than a predetermined value is charged, power supply controller 88 turns off charging switch 84 and turns on discharging switch 87 to switch to the discharging mode, and permits discharge from power supply device 100 to load 86. Furthermore, it is also possible to simultaneously perform electric power supply to load 86 and charging of power supply device 100 by turning on charging switch 84 and turning on discharging switch 87 as necessary.

Furthermore, although not illustrated, the power supply device can also be used as a power supply for a power storage device that charges and stores a battery using midnight electric power at night. The power supply device charged with the midnight power can be charged with the midnight electric power, which is surplus power of the power plant, outputs power in the daytime when the power load becomes large, and limit the peak power in the daytime to be small. Furthermore, the power supply device can also be used as a power supply that charges with both the output of a solar cell and the midnight electric power. This power supply device can efficiently store electricity in consideration of weather and power consumption by effectively using both power generated by the solar cell and midnight electric power.

The power storage device as described above can be suitably used for applications such as a backup power supply device that can be mounted on a rack of a computer server, a backup power supply device for a wireless base station such as a mobile phone, a power supply for household or factory power storage, a power supply device combined with a solar cell such as a power supply for street lamps, and a backup power supply for traffic lights and traffic indicators for roads.

INDUSTRIAL APPLICABILITY

The power supply device and the electric vehicle and the power storage device using the same, the fastening member for the power supply device, the production method for the power supply device, and the production method for the fastening member for the power supply device according to the present invention can be suitably used as a large-current power supply used for a power supply of a motor for driving an electric vehicle such as a hybrid vehicle, a fuel cell vehicle, an electric vehicle, or an electric motorcycle. Examples thereof include power supply devices such as plug-in hybrid electric vehicles, hybrid electric vehicles, and electric vehicles that can switching between an electric vehicle (EV) traveling mode and a hybrid electric vehicle (HEV) traveling mode. The present invention can be appropriately used for applications such as a backup power supply device that can be mounted on a rack of a computer server, a backup power supply device for a wireless base station such as a mobile phone, a power supply for household or factory power storage, a power storage device combined with a solar cell such as a power supply for street lamps, and a backup power supply for traffic lights and the like.

REFERENCE MARKS IN THE DRAWINGS 100, 200: power supply device
1: battery cell
1X: terminal surface
1a: exterior can
1b: sealing plate
2: electrode terminal
3: end plate
3a: fitting portion
3b: stopper portion
3c: female screw hole
4: fastening member
4X: end-part fastening part
4y: intermediate coupling part
4c: through hole
5: locking block
5c: through hole
6: coupling bar
6X: first coupling bar
6Y: second coupling bar
6A: upper coupling bar
6B: lower coupling bar
6a: upper end part
6b: lower end part
6x: integral coupling part
7: deformation stretch part
7A: intermediate opening portion
8: coupling holding part
8A: end portion opening portion
9: bolt
10: battery stack body
10a: side surface
11: insulating spacer
12: end surface spacer
13: plate member
13A, 13C: first plate
13B, 13D: second plate
14: fastening member
14X: end-part fastening part
14Y: intermediate coupling part
14a: side surface
16: coupling bar
16X: first coupling bar
16Y: second coupling bar
16a: upper end part
16b: lower end part
16c: tip end surface
16x: intersection
16s: coupling piece
17: intermediate gap
18: end part gap
20: battery stack body
20a: side surface
23: intermediate plate
24: fastening member
24X: end-part fastening part
24Y: intermediate coupling part
24Z: intermediate fastening part
81: building
82: solar cell
83: charging circuit
84: charging switch
85: DC/AC inverter
86: load
87: discharge switch
88: power supply controller
91: vehicle body
93: motor
94: generator
95: DC/AC inverter
96: engine
97: wheel
98: charging plug
HV, EV: vehicle

The invention claimed is:

1. A power supply device comprising:
a battery stack body including a plurality of secondary battery cells with a prismatic exterior can are stacked;
a pair of end plates covering both end surfaces of the battery stack body, the both end surfaces being ends along stacking of the battery stack body; and
a plurality of fastening members each disposed on a corresponding one of side surfaces of the battery stack body to fasten the end plates to each other, the side surfaces facing each other, wherein
each of the plurality of fastening members includes
end-part fastening parts at both ends of the fastening member, the both ends being ends along a length of the fastening member, each of the end-part fastening parts being fixed to a corresponding one of the end plates, and
an intermediate coupling part coupling between the end-part fastening parts,
the intermediate coupling part includes
a plurality of coupling bars each including a plate shape extending along a side surface of the battery stack body and including a wave shape in front view of a corresponding one of the fastening members, and at a time of expansion of at least one of the plurality of secondary battery cells in a stacking direction of the plurality of secondary battery cells, the coupling bars are configured to undergo elastic deformation in a plane along the side surface of the battery stack body, such that the intermediate coupling part is stretched along the stacking direction, wherein the wave shapes of the coupling bars are spaced apart from each other with one or more gaps defined therebetween in the plane along the side surface of the battery stack body, the one or more gaps configured to accommodate displacement of the coupling bars upon said elastic deformation along the plane.

2. The power supply device according to claim 1, wherein the intermediate coupling part includes a first coupling bar and a second coupling bar including a wave shape vertically symmetrical to each other, and both ends of the first coupling bar and the second coupling bar are coupled to the plurality of the end-part fastening parts.

3. The power supply device according to claim 2, wherein the first coupling bar is disposed to face an upper region of the side surface of the battery stack body, and the second coupling bar is disposed to face a lower region of the side surface of the battery stack body.

4. The power supply device according to claim 3, wherein a lower end part of a wave shape of the first coupling bar and an upper end part of a wave shape of the second coupling bar are integrally coupled by an integral coupling part, and the intermediate coupling part is one plate member.

5. The power supply device according to claim 4, wherein the intermediate coupling part couples, by a plurality of the integral coupling parts, the first coupling bar and the second coupling bar facing each other to be provided a closed loop shaped deformation stretch part.

6. The power supply device according to claim 5, wherein both end parts of the first coupling bar are coupled to an upper end part of the end-part fastening part, both end parts of the second coupling bar are coupled to a lower end part of the end-part fastening part, and coupling holding parts formed of end parts of the first coupling bar and the second coupling bar coupled by the integral coupling part and the end-part fastening part are provided on both sides of the deformation stretch part.

7. The power supply device according to claim 5, wherein each of the coupling bars includes a triangular wave shape, and the deformation stretch part includes a rhombus shape in front view.

8. The power supply device according to claim 2, wherein the first coupling bar and the second coupling bar are provided with two plate members, and the first coupling bar and the second coupling bar are partially stacked on each other.

9. The power supply device according to claim 8, wherein the first coupling bar and the second coupling bar are stacked to intersect each other at a plurality of positions in front view.

10. The power supply device according to claim 9, wherein the first coupling bar includes a central concave shape in front view, both ends of the first coupling bar are coupled to an upper end part of the end-part fastening part, and an intermediate part is disposed to face a lower region of the side surface of the battery stack body, the second coupling bar includes a central convex shape in front view, both ends of the second coupling bar are coupled to a lower end part of the end-part fastening part, and an intermediate part is disposed to face an upper region of the side surface of the battery stack body, and the first coupling bar and the second coupling bar intersect each other at a pair of intersections in a stack part, and an intermediate gap, constituting the one or more gaps, is disposed between each of the pair of the intersections.

11. The power supply device according to claim 9, wherein a plurality of intersections includes the pair of the intersections in each of the plurality of the intersections intersected by the first coupling bar and the second coupling bar, an intersection where the second coupling bar is stacked on an outside of the first coupling bar, and an intersection where the second coupling bar is stacked on an inside of the first coupling bar are alternately provided.

12. The power supply device according to claim 10, wherein each of the coupling bars includes a triangular wave shape, and the intermediate gap includes a rhombus shape in front view.

13. The power supply device according to claim 1, wherein the intermediate coupling part is disposed in a pantograph shape in front view.

14. The power supply device according to claim 1, wherein a shape of each of the coupling bars is any of a triangular wave, a sine wave, and a trapezoidal wave, or a wave shape in which some of a triangular wave, a sine wave, and a trapezoidal wave are coupled.

15. The power supply device according to claim 1, wherein a width of each of the coupling bars is ⅕ to ⅓ of a height of the side surface of the battery stack body.

16. The power supply device according to claim 1, wherein each of the fastening members further includes a locking block fixed to the end-part fastening part, each of the end plates includes, on an outer peripheral surface, a fitting portion to which the locking block is guided, and is provided with a stopper portion that abuts on the locking block on a part of the fitting portion close the battery stack body, and the locking block is locked to the stopper portion to fasten the each of the end plates with each of the fastening members.

17. The power supply device according to claim 1, wherein the battery stack body includes an intermediate plate stacked in an intermediate part of the plurality of secondary battery cells in a stack direction, each of the fastening members includes an intermediate fastening part coupled to the intermediate plate in an intermediate between the end-part fastening parts provided at both ends, and the intermediate coupling part is provided between the end-part fastening part and the intermediate fastening part.

18. An electric vehicle including the power supply device according to claim 1, the electric vehicle comprising:

the power supply device;

a motor for traveling supplied electric power from the power supply device;

a vehicle body mounting the power supply device and the motor; and a wheel driven by the motor to cause the vehicle body to travel.

19. A power storage device including the power supply device according to claim 1, the power storage device comprising:

the power supply device; and a power supply controller that controls charging and discharging of the power supply device, wherein the power supply controller enables charging of the secondary battery cells by external electric power and causes the secondary battery cells to charge.

20. A fastening member for a power supply device for fastening a pair of end plates covering both end surfaces of a battery stack body including a plurality of secondary battery cells each including a prismatic exterior can are stacked, the fastening member comprising:

end-part fastening parts at both ends of the fastening member, the both ends being ends along a length of the fastening member, each of the end-part fastening parts being fixed to a corresponding one of the end plates, and an intermediate coupling part coupling between a plurality of the end-part fastening parts, wherein the intermediate coupling part includes a first coupling bar and a second coupling bar each being disposed in a plate shape extending along a side surface of the battery stack body and disposed in a wave shape vertically symmetrical to each other in front view, and both ends of the first coupling bar and the second coupling bar are coupled to the plurality of the end-part fastening parts, wherein the wave shapes of the first and second coupling bars, in the front view, are spaced apart from each other with one or more gaps defined therebetween.

* * * * *